(12) United States Patent
Lyren

(10) Patent No.: US 11,614,306 B2
(45) Date of Patent: Mar. 28, 2023

(54) TARGET ANALYSIS AND RECOMMENDATION

(71) Applicant: Philip Lyren, Wadsworth, OH (US)

(72) Inventor: Philip Lyren, Wadsworth, OH (US)

(*) Notice: Subject to any disclaimer, the term of this patent is extended or adjusted under 35 U.S.C. 154(b) by 0 days.

(21) Appl. No.: 17/727,768

(22) Filed: Apr. 24, 2022

(65) Prior Publication Data
US 2023/0009410 A1 Jan. 12, 2023

Related U.S. Application Data

(63) Continuation of application No. 17/308,933, filed on May 5, 2021, now Pat. No. 11,320,242, which is a (Continued)

(51) Int. Cl.
G06T 19/00 (2011.01)
G02B 27/01 (2006.01)
G06N 20/00 (2019.01)
F41G 3/04 (2006.01)
F41H 13/00 (2006.01)
F41G 3/02 (2006.01)
F41G 3/16 (2006.01)
F41G 3/06 (2006.01)
G06N 20/20 (2019.01)

(52) U.S. Cl.
CPC ............... F41G 3/04 (2013.01); F41G 3/02 (2013.01); F41G 3/165 (2013.01); F41H 13/00 (2013.01); G02B 27/0172 (2013.01); G02B 27/0189 (2013.01); G06N 20/00 (2019.01); G06T 19/006 (2013.01); F41G 3/06 (2013.01); G02B 2027/014 (2013.01); G02B 2027/0138 (2013.01); G02B 2027/0141 (2013.01); G02B 2027/0178 (2013.01); G06N 20/20 (2019.01); G06T 2207/30201 (2013.01); G06T 2219/024 (2013.01)

(58) Field of Classification Search
CPC ........ G02B 27/0172; G02B 2027/0138; G02B 2027/014; G02B 2027/0141; G02B 2027/0178; G02B 27/0189; G06N 20/00; G06T 19/006; G06T 2207/30201; G06T 2219/024; F41G 3/04; F41G 3/02; F41G 3/165; F41G 3/06; F41H 13/00
See application file for complete search history.

(56) References Cited

U.S. PATENT DOCUMENTS 4,786,966 A * 11/1988 Hanson ............ G02B 27/0172 398/131
10,330,440 B2 * 6/2019 Lyren ............... G02B 27/0172
(Continued)

FOREIGN PATENT DOCUMENTS

WO WO-2015091065 A1 * 6/2015 ............ G06K 9/469

OTHER PUBLICATIONS

David L. Post, Eric E. Geiselman, and Charles D. Goodyear, Benefits of Color Coding Weapons Symbology for an Airborne Helmet-Mounted Display, Human Factors, 41(4), Dec. 1999, pp. 515-523. (Year: 1999).*

(Continued)

Primary Examiner — Jeffery A Brier

(57) ABSTRACT

An electronic device determines target information about a target and recommends a target based on the target information.

20 Claims, 17 Drawing Sheets

Related U.S. Application Data continuation of application No. 16/937,745, filed on Jul. 24, 2020, now Pat. No. 11,002,513, which is a continuation of application No. 16/449,486, filed on Jun. 24, 2019, now Pat. No. 10,724,830, which is a continuation of application No. 14/823,559, filed on Aug. 11, 2015, now Pat. No. 10,330,440.

(60) Provisional application No. 62/085,231, filed on Nov. 26, 2014.

(56) References Cited

U.S. PATENT DOCUMENTS

| | | | | |
|---|---|---|---|---|
| 10,724,830 B2* | 7/2020 | Lyren | .................. | F41G 3/02 |
| 11,002,513 B2* | 5/2021 | Lyren | .................. | G02B 27/0189 |
| 11,320,242 B2* | 5/2022 | Lyren | .................. | G02B 27/0172 |
| 2008/0204361 A1* | 8/2008 | Scales | .................. | H04N 5/265 |
| | | | | 345/8 |
| 2010/0196859 A1* | 8/2010 | Saugen | .................. | F41G 1/02 |
| | | | | 434/11 |
| 2010/0287500 A1* | 11/2010 | Whitlow | .................. | G02B 27/01 |
| | | | | 715/810 |
| 2012/0046100 A1* | 2/2012 | Roman | .................. | F41B 5/148 |
| | | | | 235/404 |
| 2012/0212398 A1* | 8/2012 | Border | .................. | G06Q 30/02 |
| | | | | 345/8 |
| 2014/0169609 A1* | 6/2014 | Rickards | .................. | H04R 1/028 |
| | | | | 381/375 |
| 2015/0228119 A1* | 8/2015 | Osterhout | .................. | G02B 27/1033 |
| | | | | 345/633 |

OTHER PUBLICATIONS

Jeffrey W. Eggers and Mark H. Draper, Multi-UAV Control for Tactical Reconnaissance and Close Air Support Missions: Operator Perspectives and Design Challenges, In Proceedings NATO RTO Human Factors and Medicine Symp., RTO-HMF-135, Neuilly-sur-Siene, CEDEX, Biarritz, France, 2006, 20 pages. (Year: 2006).*

* cited by examiner

300 

Score Table: Distance to Target

| Distance to Target | Score/ Instruct |
|---|---|
| 0 – 20 m | A1 |
| 21 – 50 m | A2 |
| 51 – 100 m | A3 |
| 101 – 200 m | A4 |
| 201 – 500 m | A5 |
| 500 + m | A6 |

Figure 3A

310 

Score Table: Weapons

| Weapons | Score/ Instruct |
|---|---|
| Handheld Combat | B1 |
| Small Arms | B2 |
| Explosives | B3 |
| RPG | B4 |
| Heavy | B5 |
| Unknown | B6 |

Score Table: Obstructions

| Obstruction | Score/ Instruct |
|---|---|
| None | C1 |
| Partial (Penetrable) | C2 |
| Partial (Non-Penetrable) | C3 |
| Full (Penetrable) | C4 |
| Full (Non-Penetrable) | C5 |
| Unknown | C6 |

Score Table: Incoming Fire

| Incoming Fire | Score/ Instruct |
|---|---|
| None | D1 |
| Yes to User | D2 |
| Yes to Other Users | D3 |
| Recent Fire | D4 |
| Aiming Weapon | D5 |
| Unknown | D6 |

Score Table: Target ID

| Target ID | Score/Instruct |
|---|---|
| Capture | E1 |
| Kill | E2 |
| Survey/Monitor | E3 |
| Track/Follow | E4 |
| Civilian | E5 |
| Unknown | E6 |

Score Table: Movement

| Movement | Score/Instruct |
|---|---|
| None | F1 |
| Stationary | F2 |
| Walk (0 – 5 FPS) | F3 |
| Run (5+ FPS) | F4 |
| Motorized | F5 |
| Unknown | F6 |

Score Table: Collateral Damage

| Collateral Damage | Score/Instruct |
|---|---|
| None | G1 |
| Structural | G2 |
| Human (Targets) | G3 |
| Human (Non-Targets) | G4 |
| Human (Unknown) | G5 |
| Unknown | G6 |

Score Table: Target Verified

| Target Verified | Score/Instruct |
|---|---|
| None | H1 |
| Partially Verified | H2 |
| Fully Verified | H3 |
| Unknown | H4 |

User A for Target 1

| Factor | Score/Instruct |
|---|---|
| Distance to target | A1 |
| Weapons | B1 |
| Obstructions | C1 |
| Incoming Fire | D2 |
| Target Identity | E2 |
| Target Movement | F2 |
| Collateral Damage | G1 |
| Target Verified | H3 |

410

User A for Target N

| Factor | Score/Instruct |
|---|---|
| Distance to target | A2 |
| Weapons | B2 |
| Obstructions | C4 |
| Incoming Fire | D2 |
| Target Identity | E2 |
| Target Movement | F2 |
| Collateral Damage | G1 |
| Target Verified | H2 |

User B for Target 1

| Factor | Score/Instruct |
|---|---|
| Distance to target | A5 |
| Weapons | B1 |
| Obstructions | C2 |
| Incoming Fire | D1 |
| Target Identity | E2 |
| Target Movement | F2 |
| Collateral Damage | G6 |
| Target Verified | H3 |

430

User B for Target N

| Factor | Score/Instruct |
|---|---|
| Distance to target | A4 |
| Weapons | B2 |
| Obstructions | C4 |
| Incoming Fire | D3 |
| Target Identity | E2 |
| Target Movement | F2 |
| Collateral Damage | G1 |
| Target Verified | H2 |

Determine, based on target information, a location and/or an identity of a weapon.
600

Determine, based on the target information, one or more of whether the weapon is firing or will be firing, a point of aim of the weapon, and where the weapon is firing.
610

Determine a recommendation for the target based on the one or more of whether the weapon is firing or will be firing, the point of aim of the weapon, and where the weapon is firing.
620

Provide the recommendation to a user and/or an electronic device.
630

Recommendation: Target 1

| Factor | Data |
|---|---|
| Distance to target | 100+ m |
| Weapons | Rifle |
| Obstructions | Partial |
| Fired Weapon? | Yes |
| Target Confirmed? | Yes |
| Special Instruction? | None |
| Collateral Damage | None |
| Location (Area) | Area 1 |

Selection: Target 2

| Factor | Data |
|---|---|
| Distance to target | 100+ m |
| Weapons | Rifle |
| Obstructions | Partial |
| Fired Weapon? | Yes |
| Target Confirmed? | Yes |
| Special Instruction? | None |
| Collateral Damage | None |
| Location (Area) | Area 3 |

Priority: Location (Area)

| Factor: Location | Priority |
|---|---|
| Area 1 | First |
| Area 3 | Second |
| Area 4 | Third |
| Area 2 | Fourth |
| Area 5 | Restricted |

1120B

Priority: Location (Area)

| Factor | Priority |
|---|---|
| Area 3 | First |
| Area 1 | Second |
| Area 4 | Third |
| Area 2 | Fourth |
| Area 5 | Restricted |

Figure 11C

TARGET ANALYSIS AND RECOMMENDATION

BACKGROUND

Target acquisition, analysis, and selection often rely primarily on a user observing multiple targets and then selecting one of the targets based on the observations. This process can be labor intensive since multiple moving targets may be involved and since it is time consuming for a user to analyze and select a target. Furthermore, the user may not even be aware of other targets.

BRIEF DESCRIPTION OF THE DRAWINGS

FIG. 3A is a table for a factor of distance to a target in accordance with an example embodiment.

FIG. 3B is a table for a factor of different types of weapons in accordance with an example embodiment.

FIG. 3C is a table for a factor of different types of obstructions in accordance with an example embodiment.

FIG. 3D is a table for a factor of different types of incoming fire in accordance with an example embodiment.

FIG. 3E is a table for a factor of different types of target identifications in accordance with an example embodiment.

FIG. 3F is a table for a factor of different types of movement of targets in accordance with an example embodiment.

FIG. 3G is a table for a factor of different types of collateral damage with targets in accordance with an example embodiment.

FIG. 3H is a table for a factor of different types of verified targets in accordance with an example embodiment.

FIG. 4A is a table of factors determined for a first user in accordance with an example embodiment.

FIG. 4B is a table of factors determined for a second user in accordance with an example embodiment.

FIG. 6 is a method to determine a recommendation for a target in accordance with an example embodiment.

FIG. 11A is target data for a first target selected by a target recommender in accordance with an example embodiment.

FIG. 11B is target data for a second target selected by a user in accordance with an example embodiment.

FIG. 11C is target data being adjusted per machine-learning in accordance with an example embodiment.

SUMMARY OF THE INVENTION

Figure 1:
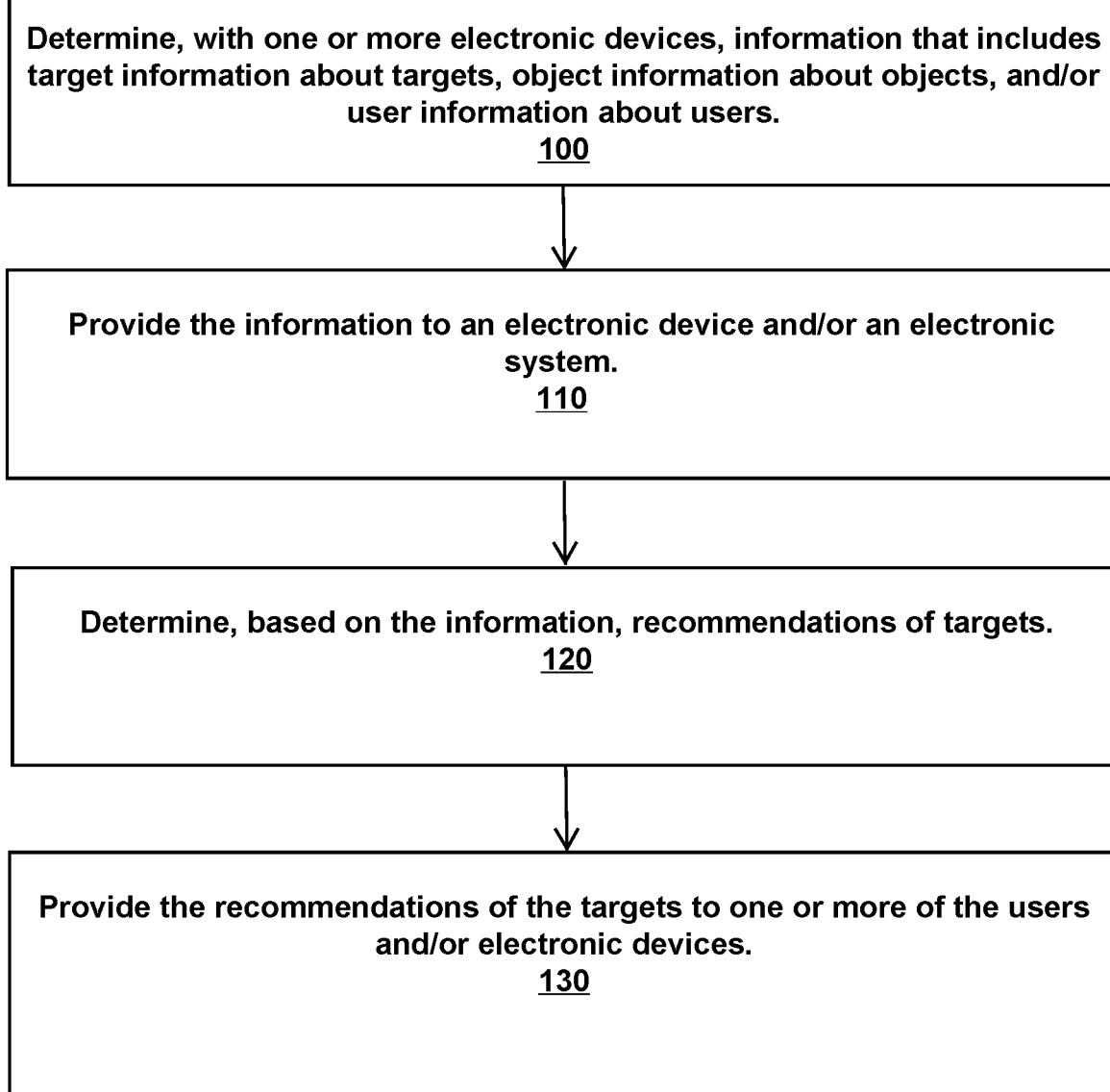
FIG. 1 is a method to provide recommendations of targets to users in accordance with an example embodiment.

Example embodiments include systems, apparatus, and methods that include one or more electronic devices that are configured to acquire information about targets, analyze the acquired information, and make recommendations to users about the targets.

Other example embodiments are discussed herein.

DETAILED DESCRIPTION

Example embodiments include systems, apparatus, and methods that include one or more electronic devices that are configured to acquire information about a target, analyze this information, and recommend or assign a target to one or more users. A display displays the recommendation or the assignment to the users.

Example embodiments increase efficiency and accuracy of acquiring targets, analyzing target information, selecting targets, and providing recommendations or suggestions to users. These recommendations can include more than which target to select. For example, electronic devices provide a user with information that assists in seeing or determining a location of targets and other users, determining weapons associated with targets, determining where weapons are being aimed or fired, determining obstructions, determining weapon penetration locations or vulnerabilities on objects or at areas, receiving assistance from other users on a target, preventing duplicate monitoring or firing on a same target, determining activity or movement of a target, assisting in rapid and efficient selection of targets, determining safe locations for users to move, and sharing information among users.

Machine-learning assists in executing one or more example embodiments. For example, machine-learning builds a model and/or one or more algorithms (such as a target recommender) and executes this model and/or algorithms to make predictions, decisions, and recommendations. A model and/or algorithm is dynamic and learns from data in that it changes, adjusts, modifies, and adapts to improve its accuracy and efficiency (as opposed to repeatedly following static, explicit program instructions).

In an example embodiment information is shared among the electronic devices and provided to build a map of targets, obstructions, users, weapons, weapon penetration locations, and other information that can be shared among the users, displayed, stored, processed, and/or transmitted. By way of example, this information and/or data can originate from an electronic device that determines, monitors, detects, tracks, senses, processes, and/or views the target and/or captures images or data of the target. For example, the electronic device can be proximate to the target (e.g., located within a few meters) or located a greater distance from the target (e.g., located more than one hundred meters or many kilometers). As another example, one of the electronic devices can be located on the target, be located with the target, be part of the target, or be the target.

Images of targets, weapons, obstructions, geographical areas, and users are processed, built, transmitted, stored, and shared to assist in executing example embodiments. The image of the target or object can include a two-dimensional (2D) image or model, a three-dimensional (3D) image or model, a virtual image, and/or a virtual object. This image or model moves to match or emulate real-time movement of the target. For example, a displayed image of a target moves in synchronization with the actual, real target that the image represents. Furthermore, an image of a target includes targets that are obstructed to one or more users. For example, an image displayed at an electronic device of a user resembles an orientation, size, and/or shape of how the target would appear in a field of view of the electronic device or the user of the electronic device if the target were not obstructed or if the target were viewable from the location of the electronic device or the user.

FIG. 1 is a method to provide recommendations of targets to users.

Block 100 states determine, with one or more electronic devices, information that includes target information about targets, object information about objects, and/or user information about users.

By way of example, a target includes a person, an object, a thing, and/or an area; objects include things that are visible or tangible; and users include people, robots, machines, and/or electronic devices. Target information can include object information whether or not the object is the target, is near the target, or is associated with the target. For example, target information includes information about moveable objects, immovable objects, small objects (such as weapons), and/or large objects (such as obstructions, vehicles, dwellings, and other structures). For instance, a target includes a person, a weapon that the person carries, and/or a vehicle in which the person moves.

Object information includes information about moveable objects, immovable objects, areas, people, and other things. For example, an object can include manmade objects (such as automobiles, buildings, and other structures) and natural or non-manmade objects (such as trees, hills, embankments, foliage, etc.).

User information includes information about one or more people, machines, and electronic devices.

An electronic device captures, obtains, records, provides, receives, and/or transmits information about the targets, objects, and/or users. For instance, a user wears and/or uses an electronic device that captures and/or displays an image and/or video of the target, object, and/or user, determines a distance to the target, object, and/or user, determines a location of the target, object, and/or user, captures a view of the target, object and/or user, senses a heat signature of the target, object and/or user, determines an identity of the target, object and/or user, determines obstructions near a target, object and/or a user, determines weapons of a target, determines an identity of a target, object and/or user, or communicates with an electronic device at, with, or near the target, object and/or user.

Block 110 states provide the information to an electronic device and/or an electronic system.

The determined information is processed, stored, transmitted, displayed, and/or shared between one or more electronic devices. For example, one or more handheld portable electronic devices (HPEDs) capture target information, object information, and/or user information and wirelessly transmit this information to one or more other HPEDs (e.g., over an encrypted, private peer-to-peer network), a central server, and/or a computer or electronic system. For instance, a computer target acquisition analysis and recommendation system (CTAARS) or a target recommender (including hardware and/or software) receives information from multiple electronic devices, analyzes this information, and provides target recommendations and other information to the electronic devices and users of the electronic devices.

Targets, objects, and/or users can be determined with information from one or more electronic devices. As an example, multiple different electronic devices at a geographical area sense a person and objects (such as weapons), recognize the people with facial recognition and the objects with object recognition, and share this information with each other over a peer-to-peer (P2P) or private network. The electronic devices or a target recommender in communication with these electronic devices analyze the collected information, assign users to targets in the geographical area, and perform other methods discussed herein. As another example, a handheld portable electronic device (HPED) captures images of an area and transmits these images over a network to a computer system (such as CTAARS). The computer system analyzes the images and selects a target that is located in the images and/or the area. As another example, a user views an area on a display of an electronic device and interacts with the electronic device through a user interface to select an object being displayed as the target. As yet another example, an electronic device receives location or coordinate information for a possible target, navigates to this location to verify an identity or existence of the target, and provides the determined information to other electronic devices and/or the target system.

The electronic devices can be located at a common geographical location and near or proximate each other (e.g., located within several feet from each other, located several yards or more away from each other, located within eye sight of each other, located within several hundred yards of each other, etc.). Alternatively, the electronic devices are located at different geographical locations that are far from each other (e.g., located a kilometer or more apart, located in different cities or states, located in different countries, etc.).

Block 120 states determine, based on the information, recommendations of targets.

One or more electronic devices and/or a computer system analyze the information and recommend a target that includes one or more of a recommendation, a suggestion, an assignment, an instruction, or a selection of a target for a user. For example, each user is assigned to one or more targets based on one or more of information about a target, information about an object, information about a user, information about an area in which the target and/or the user are located, and information about an object with or proximate the target and/or the user. As another example, users are provided with recommendations where to move and/or provided with information about weapon penetration locations and/or weapon vulnerability locations on an object or at an area.

Block 130 states provide the recommendations of the targets to one or more of the users and/or electronic devices.

Recommendations can be transmitted, displayed, stored, processed, and/or mapped. For example, an electronic device of a user displays a recommendation as to a target selected for the user, a recommendation where to physically move, a recommendation on weapon penetration locations of a target or object.

Recommendations can include visual images, text, audio, and other mediums to provide information.

Consider an example in which a handheld portable electronic device (HPED) of a user includes a display that displays a plurality of different targets in a field of view of the user. For example, the user wears a wearable electronic device with a camera that captures the field of view of the user. A target acquisition analysis and recommendation system (CTAARS) analyzes target information, selects one of the targets in the field of view of the user, and transmits this selection to the HPED. The HPED displays an image of the target on, over, with, and/or near the target in the field of view such that the user can see or distinguish the selected target from the other, non-selected targets in the field of view. For instance, the display displays or presents one or more of two-dimensional (2D) images, three-dimensional (3D) images, virtual images, and/or virtual objects over or in place of the selected target such that the user can see on the display a location, a distance, an orientation, a shape, a size, and/or an activity of the target.

Consider an example in which one or more electronic devices (such as on a flying drone, at a satellite, or with a soldier) gather information on multiple different users and targets at a geographical location. A target recommender selects targets and performs other embodiments discussed herein. For example, an electronic scope mounted to a rifle communicates with the target recommender and displays images of targets over objects and people that are visible through the electronic scope. These images assist shooters in identifying a target, prioritizing targets, sighting a target, and engaging a target (e.g., shooting at the target, taking photographs of the target with the electronic scope, and/or gathering more information about the target with electrical devices in the electronic scope).

A recommendation can also include instructions as to what actions to take with regard to the selected target. For example, the instructions instruct the user to monitor the target, engage the target, fire upon the target, apprehend the target, collect information about the target, photograph the target, collect surveillance data about the target (such as information regarding ambient environment conditions, objects associated with the target, other persons or animals proximate to the target), communicate with the target, etc.

Consider an example in which soldiers engage numerous combatants dispersed throughout an urban environment. Each soldier carries a HPED or wears a wearable electronic device (WED) that collects information about targets (the combatants, weapons of the combatants, vehicles of the combatants, objects in the urban environment, etc.) and transmits this information to a target recommendation system or a target recommender (e.g., a target recommender included with the electronic devices or target recommender that is separate from these electronic devices). The target recommendation system analyzes the collected information, prioritizes the targets, and assigns each user to one or more targets and provides each user with instructions. By way of example, the instructions includes tasks to complete, such as instructions to move to a particular location, capture an identified combatant, disable or destroy a vehicle, collect intelligence information about a combatant or building in which a combatant is located, fire at a target, provide cover fire for another user, provide assistance to another user, etc. The HPEDs and/or WEDs display the instructions with images, maps, text, indicia, etc.

Consider further the example in which soldiers engage numerous combatants dispersed throughout the urban environment. The WED and HPEDs assist the soldiers in performing activities in a more efficient, effective, and expeditious manner. By way of example, the target recommendation system notifies an electronic device of a soldier when a soldier's weapon has a point of aim on another soldier to prevent an incident of friendly fire. As another example, the target recommendation system assigns targets to the combatants so two soldiers are not unnecessarily, accidentally, or unintentionally firing or engaging a same combatant when such duplicative engagement would be unwanted or redundant. As another example, the target recommendation system provides an electronic map to electronic devices of the soldiers. This map includes 2D and 3D images and locations of combatants, weapons, other soldiers, and other objects (such as vehicles, buildings, and other objects in the urban environment). As yet another example, the target recommendation system analyzes combatant locations and combatant weapons and recommends locations where soldiers can move. For instance, these locations provide a better location point to engage a combatant or a safer location with a reduced probability of being injured or targeted with weapons of the combatants. As yet another example, the target recommendation system instructs soldiers when other soldiers request or require assistance. For instance, a soldier receives an inordinate amount of incoming enemy fire from a combatant location, and other soldiers are notified to fire upon the combatant location. As yet another example, an electronic device of a soldier captures an image of an individual in the urban environment, identifies the individual as a combatant, and transmits the location and identity of the individual to the target recommendation system and to electronic devices of other soldiers. As yet another example, a soldier receives a selection of a combatant and fires on and kills the combatant. The electronic device of the soldier notifies the target recommendation system and other electronic devices of the death or elimination of the combatant.

Consider an example in which a target recommender builds a 3D map that depicts targets (e.g., people) holding the weapons, users, objects and/or obstructions where each of the targets is located, and assignments of the users to targets (e.g., users can visually distinguish which user is assigned to which target).

Recommendations can be based on and/or include user information as well as target information. Consider an example in which a target recommender determines a location of a combatant (target) four hundred meters (400 m) away from a first soldier and five hundred meters (500 m) away from a second soldier. Both soldiers have an unobstructed line of sight to the combatant. In considering whether to assign the first soldier or the second soldier to the combatant, the target recommender takes into account a factor of training of the soldier, shooting history (such as an amount of previous long-distance shots at or over 500 m), environmental conditions (such as wind speed and wind direction for each soldier), and weapon and ammunition type of each soldier. Even though the combatant is closer to the first soldier, the target recommender assigns the combatant to the second soldier since the second soldier is graded as a scout sniper and is thus highly skilled in long-range precision fire.

Figure 2:
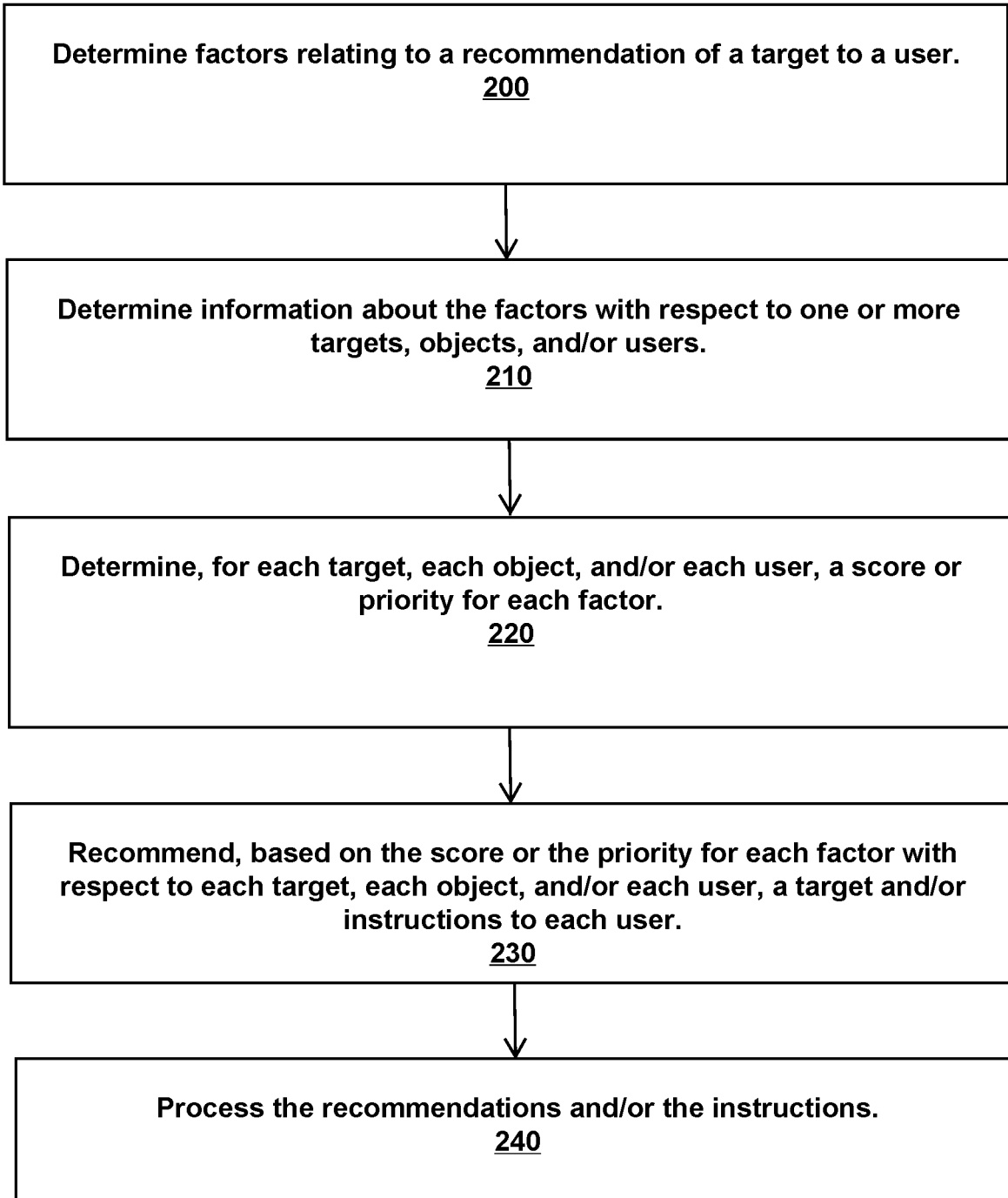
FIG. 2 is a method to recommend targets to users in accordance with an example embodiment.

FIG. 2 is a method to recommend targets to users.

Block 200 states determine factors relating to a recommendation of a target to a user.

By way of example, the factors include, but are not limited to, one or more of a location of a target and/or a user, a location of a weapon, an identity of a target and/or a user, an identity of a weapon of a target and/or a user, a location of an object with or proximate a target and/or a user, an identity of an object with or proximate a target and/or a user, an image of a target and/or a user, prior activity or history of a target and/or a user, an activity of a target and/or a user, an activity of a weapon and/or object, an obstruction near or proximate a target and/or a user, a point of aim of a weapon of a target and/or a user, a proximity or distance of a target and/or a user to another target, user, weapon, and/or object, whether a target and/or a user is receiving firing from a weapon, whether a target and/or a user is firing a weapon, a rate of incoming fire from a weapon, a rate of outgoing fire from a weapon, whether a user requests or desires or needs assistance from another user, ammunition or supplies of a target and/or a user, whether a target and/or a user is hit with fire from a weapon (including a person being wounded or injured), elevation of a target and/or a user, coordinate or GPS of a target and/or a user, movement of a target and/or a user, rate of movement a target and/or a user, size or shape of a target, priority of a target, cover or protection of a target and/or a user, electronic devices with or near a target and/or a user, transmission of information from or to a target and/or a user, and communication or commands or words spoken to or from a target and/or a user. The factors also include information regarding obstructions, such as including a size of the obstruction, a shape of the obstruction, a location of the obstruction, an identity of the obstruction, a description of the obstruction, materials that form or make the obstruction, specifications for the obstruction, drawings of the obstruction, damage to the obstruction, vulnerability or penetration of the obstruction to a weapon, movement of the obstruction, and weight of the obstruction.

Block 210 states determine information about the factors with respect to one or more targets, objects, and/or users.

One or more electronic devices determine the information about the factors. For example, electronic devices collect, gather, retrieve, and/or sense the information.

Block 220 states determine, for each target, each object, and/or each user, a score or priority for each factor.

For example, a score or a priority is determined for each factor with respect to each target, each object, and/or each user.

Block 230 states recommend, based on the score or the priority for each factor with respect to each target, each object, and/or each user, a target and/or instructions to each user.

For example, one or more users are provided with instructions with regard to a target and/or recommendations with regard to a target. For instance, each user is assigned to one or more targets and provided with actions to take with regard to the assigned target. As another example, an electronic device displays a map that shows a path or coordinates for where the user should move. As another example, a display displays 2D or 3D images of people, and different colors of these images represent different target priorities. For instance, each color is associated with a different priority or target action (e.g., red colored targets mean shoot the target; blue colored targets mean collect more information about the target; green colored targets mean follow or track the target; yellow colored targets mean apprehend the target; etc.). As yet another example, a display displays 2D or 3D images of weapon penetration locations or weapon vulnerability locations on an object. For instance, each color is associated with a different vulnerability or safety (e.g., red colored area means a combatant weapon can penetrate through the object at this location; blue colored area means a combatant can see the user at this location; green colored area means a safe zone where weapons cannot penetrate and combatants cannot see; yellow colored areas mean possible danger areas or caution areas; etc.).

Block 240 states process the recommendations and/or the instructions.

For example, process includes, but is not limited to, one or more of displaying the recommendations and/or the instructions, transmitting the recommendations and/or the instructions, storing the recommendations and/or the instructions, executing the recommendations and/or the instructions, analyzing the recommendations and/or instructions, and processing the recommendations and/or the instructions.

Consider an example in which one or more electronic devices collect information on targets, objects, and/or users. A target analysis and recommendation system receives this information, analyzes the information to determine factors that influence assignment of users to targets, and assigns tasks and targets to users based on the analysis of the factors. This assignment includes prioritizing multiple targets among multiple users and providing assigned priorities to the users.

In an example embodiment, displayed images of targets and/or objects appear to remain fixed at their locations in the field of view even if the users moves his head and/or moves the display of the electronic device. For example, from a point of view of a user, an image of a target remains at a stationary location in the field of view on or over the actual location of the target. For instance, the image of the target and the target itself align and remain aligned or superimposed with each other as the electronic device and/or user moves. Movement of the image coincides with movement of the target so the image and the target remain aligned. For example, a location of the image on the display moves so the image remains fixed or stationary over the target if the target and/or electronic device move.

FIGS. 3A-3H are tables of example factors that influence a selection of a target. By way of example, the factors can be evaluated, scored, prioritized, assessed, analyzed, and provided with or without instructions. For illustration, the tables show a first column as a subcategory, definition, or division of the factor and a second column as a score and/or instructions. The score and/or instructions can include, but are not limited to, numbers, percentages, values, priorities, instructions, formula, mathematical equations, and information with regard to the factor. Further, the tables show the score and/or instruction column with letter designations (such as A1, B1, C1, etc.). These designations are shown as letters as an example illustration and represent different scores and/or instructions with actual scores and/or instructions being omitted for brevity. For example, an "A1" is replaced with an actual score or instruction that is displayed and/or provided to a user. As another example, the "A1" is a numerical value or equation that is used to prioritize a target or determine an example embodiment.

FIG. 3A shows a table 300 for the factor of the distance to the target. As an example illustration, distances to the target are divided into six rows with a first column that shows distances (represented as 0-20 m, 21-50 m, 51-100 m, 101-200 m, 201-500 m, and 500+m) to the target and a second column showing the score and/or instructions for the distance (represented as A1-A6).

The scores and/or instructions can depend on the distance and other factors, such as a weapon. Consider an example in which users (soldiers) engage in urban combat with combatants (targets). The soldiers and the combatants exchange fire with small arms and firearms (such as M16 rifles and handguns). Table 300 would show multiple distances to combatants for the soldiers. Closer targets would have a higher numerical score, and farther targets would have a lower numerical score. For instance, a first armed combatant that is 0-20 m from a soldier would have a higher priority than a second armed combatant that is 500+m from the soldier since the first combatant would pose a greater safety threat with a firearm to the soldier than the second combatant.

In the tables, rows higher in a table do not necessarily imply a greater score since the scores and/or instructions can be designated or assigned according to a variety of different situations and scenarios. Consider an example in which users (police officers) monitor and track criminal suspects (targets). As a target gets farther away, it becomes increasingly more difficult to gather information about the target and track it. Targets farther away can also more easily elude police officers. Closer targets would have a lower numerical score, and farther targets would have a higher numerical score. For instance, a criminal suspect that is 0-20 m from a police officer would have a lower priority than a second criminal suspect that is 101-200 m from the police officer since the second criminal suspect would pose a greater possibility of escaping or alluding the police officer. Alternatively, the closer suspect could have a higher priority since he or she is more easily captured than a farther suspect.

FIG. 3B shows a table 310 for the factor of different types of weapons. As an example illustration, the different types of weapons are divided into six rows with a first column showing a type of weapon (represented as Handheld Combat, Small Arms, Explosives, RPG, Heavy, and Unknown) and a second column showing the score and/or instructions for the weapon (represented as B1-B6).

Consider an example in which military officials (users) search for hidden weapons (targets). A rocket propelled grenade (RPG) launcher could have a higher priority than a handheld combat weapon (such as a pistol) since the RPG poses a greater security and safety threat than a pistol. As such, a priority for B4 (for the RPG) would have a higher value or greater importance than B1 (for handheld combat weapon).

Consider another example in which "Heavy" weapon in row 5 of table 310 is defined as surface to air (SAM) missiles. An electronic device analyzes a satellite photograph of a geographical area and determines the existence of a SAM missile. B5 (the associated instructions for "Heavy" weapons that include SAM missiles) designates the following instructions: Execute subroutine NOTIFY X21. This subroutine summarizes the gathered information (such as identification and description of SAM missiles, location of SAM missiles, time of discover of SAM missiles, and activity or movement of SAM missiles) and sends this information as an email or text to a list of military commanders. The subroutine converts the gathered information into voice information, places a computer generated phone call to one of the commanders, and provides this voice information to the commander during the phone call.

FIG. 3C shows a table 320 for the factor of different types of obstructions. As an example illustration, the different types of obstructions are divided into six rows with a first column showing a type of obstruction (represented as None, Partial (Penetrable), Partial (Non-Penetrable), Full (Penetrable), Full (Non-Penetrable) and Unknown) and a second column showing the score and/or instructions for the obstruction (represented as C1-C6).

Consider an example in which a soldier has a .50 caliber rifle with electronics that communicate with a target recommender. The target recommender determines the presences of two targets in a nearby building (the obstruction). A first target located in the building is not visible to the soldier but could be hit with bullets fired from his rifle, and the first target is designated as being fully covered but penetrable (i.e., "Full (Penetrable)" with an instruction of C4). A second target located in the building is not visible to the soldier and could not be hit with bullets fired from the rifle, and the target is designated as being fully covered and non-penetrable (i.e., "Full (Non-Penetrable)" with an instruction of C5). Instructions associated with C4 indicate engage and fire, and instructions associated with C5 indicate monitor but do not fire. Based on the instructions of C4 and C5, the target recommender recommends that the soldier fire at the location of the first target and monitor a location of the second target. An electronic scope attached to the rifle displays a 3D image of the first target in a field of view of the soldier at the location of the first target in the building and displays an instruction to "Fire" with the selected first target. The electronic scope also displays a 3D image of the second target in the field of view of the soldier at the location of the second target in the building and displays an instruction "Monitor" with the second target. Both images can be simultaneously displayed at their respective real or actual locations in the field of view of the soldier.

FIG. 3D shows a table 330 for the factor of different types of incoming fire from weapons to one or more users. As an example illustration, the different types of incoming fire are divided into six rows with a first column showing a type of incoming fire (represented as None, Yes to User, Yes to Other Users, Recent Fire, Aiming Weapon, and Unknown) and a second column showing the score and/or instructions for the obstruction (represented as D1-D6).

Consider an example in which soldiers (users) are equipped with electronic devices that communicate with each other with a target recommendation system or a target recommender. The soldiers engage in heavy smalls arms fire with numerous combatants spread across an urban environment. The target recommendation system determines locations of combatants, weapons of combatants, directions of fire from the weapons of the combatants, locations of fire from the weapons of the combatants, directions of aim of the weapons of the combatants, and other factors discussed herein. Priorities for incoming fire from combatants are arranged in the following hierarchy: Priority one of a soldier is to fire on a combatant currently firing a weapon on the soldier (represented as "Yes to User" with D2); priority two of a soldier is to fire on a combatant currently aiming or pointing a weapon at the soldier (represented as "Aiming Weapon" with D5); priority three of a soldier is to fire on a combatant currently firing a weapon at another soldier (represented as "Yes to Other Users" with D3); priority four of a soldier is to fire on a combatant that recently fired a weapon (e.g., a weapon that has a heat signature as being fired and represented as "Recent Fire" with D4); priority five of a soldier is to fire on a combatant with or near a weapon (represented as "None" with D1); and priority six of a soldier is to fire on a combatant verified as being a combatant but unknown whether the combatant currently has a weapon (represented as "Unknown" with D6). The target recommendation system gathers information during the armed engagement with the combatants and provides soldiers with recommendations on which combatant to fire per the priorities.

FIG. 3E shows a table 340 for the factor of different types of target identifications (IDs). As an example illustration, the different types of target IDs are divided into six rows with a first column showing a type of target ID (represented as Capture, Kill, Survey/Monitor, Track/Follow, Civilian, Unknown) and a second column showing the score and/or instructions for the target IDs (represented as E1-E6).

Consider the example above in which the soldiers (users) are equipped with electronic devices that communicate with each other with the target recommendation system, and the soldiers engage in heavy smalls arms fire with numerous combatants spread across the urban environment. Non-combatants (such as civilians, women, children, and animals) are dispersed throughout the urban environment. Given the various distances to targets, smoke, haze, movement of targets, and other factors, a soldier may not be able to visually determine whether a target is a combatant, a civilian, a child, an animal, etc. Further, two combatants can have different instructions. Such as one combatant being identified as a terrorist with a kill instruction, and another combatant being identified as a wanted criminal with a capture but not-kill instruction. The target recommendation system identifies people, animals, and objects in the urban environment, builds a map of this information, and provides the map and instructions to the soldiers based on the identifications. For example, a first target is identified as R.L.L. with a designated "Capture" target ID and E1 instructions to capture but not kill the combatant. A second target is identified as P.S.L. with a designated "Survey and Monitor" target ID and E3 instructions to collect surveillance data on this target. A third target is identified as the mayor with a designated "Civilian" target ID and E5 instructions to do not harm or monitor this target. A fourth target cannot be identified and is designated as "Unknown" target ID with E6 instructions to do not harm but track this target.

FIG. 3F shows a table 350 for the factor of different types of movement of targets. As an example illustration, the different types of movement are divided into six rows with a first column showing a type of movement (represented as None, Stationary, Walk (0-5 feet per second, FPS), Run (5+ FPS), Motorized, and Unknown) and a second column showing the score and/or instructions for the movements (represented as F1-F6).

Consider an example in which police officers (users) plan to arrest numerous suspects (targets) during a raid in a large building. Electronic devices survey, track, and follow movement of the suspects. Each different type of movement is provided with a numerical score from 1 to 10. These scores are added with scores from other factors to determine what action to take on a suspect. By way of example, the scores include the following: a suspect with no movement (represented as "None") scores a value of 1 (F1); a suspect with little movement but remains at a stationary location (represented as "Stationary") scores a value of 2 (F2); a suspect that is walking (represented as "Walk") scores a value of 4 (F3); a suspect that is running (represented as "Run") scores a value of 8 (F4); a suspect that is moving in a motorized vehicle (represented as "Motorized") scores a value of 10 (F5); and a suspect with unknown movement (represented as "Unknown") scores a value of 2 (F6).

FIG. 3G shows a table 360 for the factor of different types of collateral damage with targets. As an example illustration, the different types of collateral damage are divided into six rows with a first column showing a type of collateral damage (represented as None, Structural, Human (Targets), Human (Non-Targets), Human (Unknown), and Unknown) and a second column showing the score and/or instructions for the collateral damage (represented as G1-G6).

Consider an example in which a soldier (user) considers firing a rocket-propelled grenade (RPG) at a building (target). A target recommendation system or a target recommender determines information on the target, the user, the building, the RPG, and other information and provides the soldier with one of the following instructions: If firing the RPG on the building will incur no collateral damage (represented as "None"), then fire the RPG (instruction G1); if firing the RPG on the building will incur some structural collateral damage (represented as "Structural"), then the soldier has discretion to fire or not to fire the RPG (instruction G2); if firing the RPG on the building will incur human collateral damage but the humans are targets (represented as "Human (Targets)"), then fire the RPG (instruction G3); if firing the RPG on the building will incur human collateral damage but the humans are not targets (represented as "Human (Non-Targets)"), then do not fire the RPG (instruction G4); if firing the RPG on the building will incur human collateral damage with unknown identity of the humans (represented as "Humans (Unknown)"), then do not fire the RPG (instruction G5); and if firing the RPG on the building will incur unknown collateral damage (represented as "Unknown"), then fire the RPG only with commanding officer voice confirmation (instruction G6).

FIG. 3H shows a table 370 for the factor of different types of verified targets. As an example illustration, the different types of verified targets are divided into four rows with a first column showing a type of verified target (represented as None, Partially Verified, Fully Verified, and Unknown) and a second column showing the score and/or instructions for the verified target (represented as H1-H4).

Consider an example in which a user interacts with an electronic camera that includes a processor, a display, a microphone, a network interface to wirelessly communicate with the Internet, and a memory storing instructions that execute a target recommender. The user is instructed to take photographs of "people of interest" in an open market area. The user, however, does not know the identity of such people and relies on the target recommender to provide instructions. When the user points and focuses the camera at people in market, the target recommender performs facial recognition of each person and displays instructions to the user as follows: If the target is not verified (represented as "None") then do not take a picture or record any information (instruction H1); if the target is partially verified (represented as "Partially Verified") then take 1-2 photographs and move to next target (instructions H2); if the target is fully verified (represented as "Fully Verified") then take more multiple photographs, engage microphone to record audio including comments of the user, and transmit photos and audio in real-time to over Internet to designated internet protocol (IP) address (instruction H3); and if the target is not able to be verified (represented as "Unknown") then take 1-2 photographs and move to next target (instructions H4).

Actions of the target recommender can be automatically executed. For example, when a user focuses the lens of the camera on a person, the target recommender identifies the person and automatically takes a picture of the person per the instructions. For instance, the target recommender instructs the camera to take a picture when the person is verified or recognized. In this manner, the user is not burdened with taking the pictures or deciding when to take a picture. Further, the target recommender can make this determination more quickly than the user and is not subject to human error.

FIGS. 4A and 4B are tables of example user scenarios applied to the factors in the tables of FIGS. 3A-3H. By way of example, two users (User A and User B) encounter multiple targets (Target 1 to Target N, where N is a whole number greater than 1). The factors in FIGS. 3A-3H are determined for each user with respect to each target, and one or more recommendations are determined and provided to the users and/or electronic devices of the users.

FIG. 4A shows a table 400 in which eight factors (shown in a first column as distance to target, weapons, obstructions, incoming fire, target identity, target movement, collateral damage, and target verified, discussed in connection with FIGS. 3A-3H) are determined for User A with respect to a first target (Target 1) and scored and/or provided with instructions (shown in a second column as score/instruct). FIG. 4A also shows a table 410 in which the eight factors are determined for User A with respect to a second target (Target N) and scored and/or provided with instructions.

FIG. 4B shows a table 420 in which the eight factors are determined for User B with respect to the first target (Target 1) and scored and/or provided with instructions. FIG. 4B also shows a table 430 in which the eight factors are determined for User B with respect to a second target (Target N) and scored and/or provided with instructions.

A target recommender analyzes the information collected with regard to the factors in tables 400, 410, 420, and 430 and determines a target recommendation for User A and User B.

Consider an example in which User A and User B are soldiers that are engaged in a military ground offensive with numerous combatants (Targets 1 to Target N).

Electronic devices determine the information in table 400 as follows: Target 1 is 0-20 m from User A; Target 1 has a handgun; no obstructions exist between User A and Target 1; Target 1 is firing the handgun at User A; Target 1 is identified with a kill order; Target 1 is stationary; no collateral damage will occur if User A fires his weapon on the Target 1; and Target 1 has an identity that is fully verified.

Electronic devices determine the information in table 410 as follows: Target N is 21-50 m from User A; Target N has a rifle; Target N is located behind an obstruction but the obstruction is fully penetrable with the weapon of User A; Target N is firing the rifle at User A; Target N is identified with a kill order; Target N is stationary; no collateral damage will occur if User A fires his weapon on the Target N; and Target N has an identity that is partially verified.

Based on an analysis of the target information, the target recommender recommends that User A prioritize Target 1 over Target N. This recommendation is based on the fact that Target 1 poses a greater immediate safety risk to User A since Target 1 is closer to User A than Target N, and no obstructions exist between Target 1 and User A.

Electronic devices determine the information in table 420 as follows: Target 1 is 201-500 m from User B; Target 1 has a handgun; Target 1 is partially obstructed but the obstruction is penetrable with the weapon of User B; Target 1 is not firing the handgun at User B; Target 1 is identified with a kill order; Target 1 is stationary; collateral damage is unknown if User B fires his weapon on the Target 1; and Target 1 has an identity that is fully verified.

Electronic devices determine the information in table 430 as follows: Target N is 101-200 m from User B; Target N has a rifle; Target N is located behind an obstruction but the obstruction is fully penetrable with the weapon of User B; Target N is firing at other users; Target N is identified with a kill order; Target N is stationary; no collateral damage will occur if User B fires his weapon on the Target N; and Target N has an identity that is partially verified.

Based on an analysis of the target information, the target recommender recommends that User B prioritize Target N over Target 1. This recommendation is based on the fact that Target 1 does not pose an immediate safety risk to User B since Target 1 is located 201-500 m from User B and has a handgun. Furthermore, Target N poses a greater immediate safety risk to other users since Target N is currently firing on other users.

Figure 5:
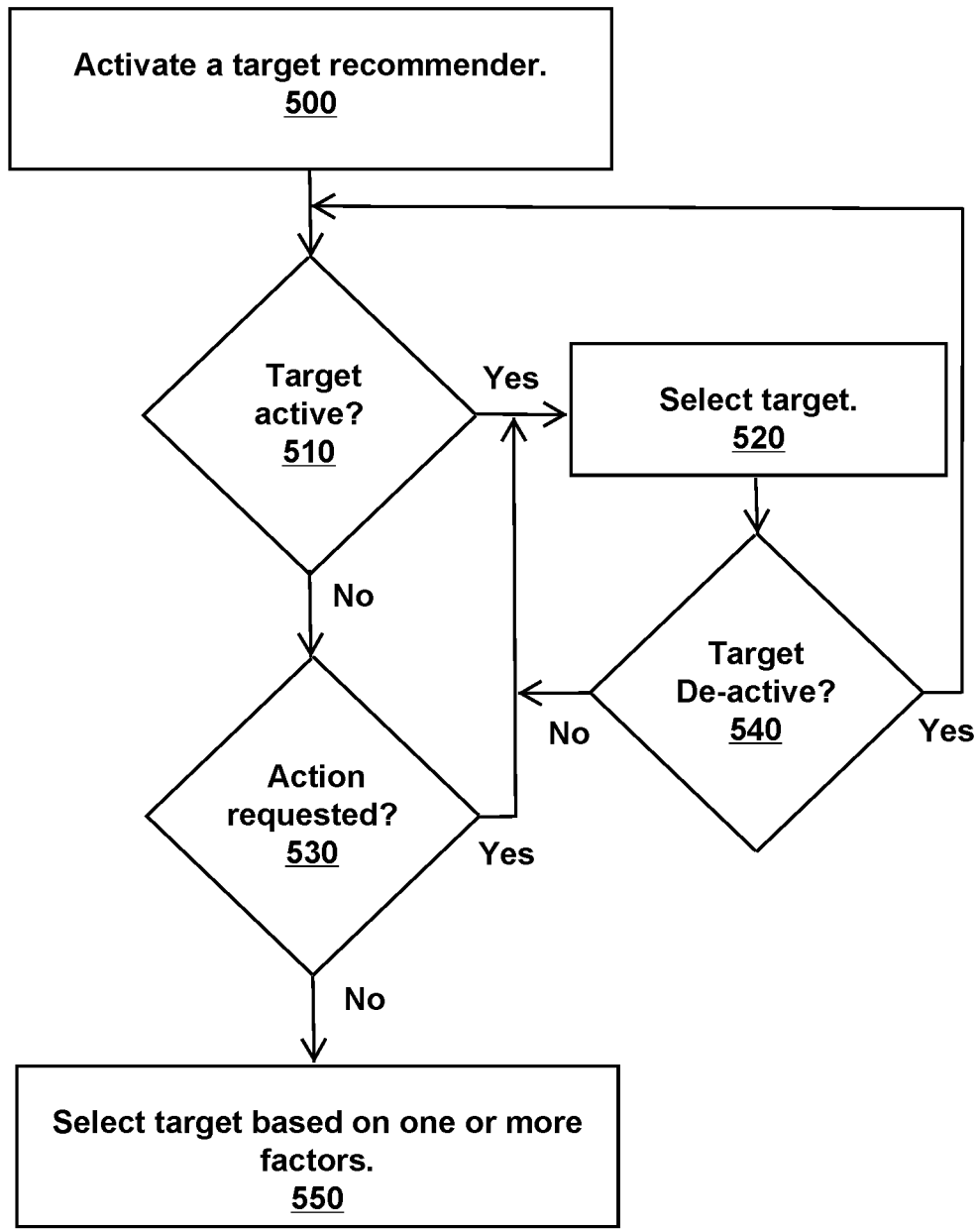
FIG. 5 is a method to select a target based on one or more factors in accordance with an example embodiment.

FIG. 5 is a method to select a target based on one or more factors.

Block 500 states activate a target recommender.

By way of example, the target recommender can include one or more of an electronic device, a computer or electronic system, a computer target acquisition analysis recommendation system, hardware, and a software application.

Block 510 makes a determination as to whether a target is active.

A determination is made as to whether the target is active, such as moving, armed, performing an action, designated as a target (such as designated as a combatant or an object or person of interest), proximate a weapon, using a weapon, etc. For example, a determination is made as to whether a user, an electronic device, a machine, and/or an object receives incoming fire from a target and/or a weapon, such as rounds from a firearm or other projectiles launched from a weapon. As another example, a determination is made as to whether the weapon is activated, being held, used, engaged, or has a particular point of aim, such as being aimed at a user, a vehicle of a user, or a location of a user. As another example, a determination is made as to whether the target is moving or performing an action (such as an illegal or criminal action). As another example a determination is made as to whether the target is identified as a target (such as being recognized as a combatant, a person of interest, a criminal, a suspect, etc.).

If the answer to the determination in block 510 is "yes" then flow proceeds to block 520 and the target is selected. If the answer to the determination in block 510 is "no" then flow proceeds to block 530.

For example, select the target and/or weapon firing or aiming at a user, an electronic device, a machine, an object, and/or a location. As another example, select the target and/or weapon providing incoming fire from the weapon, such as rounds from a firearm or other projectiles launched from a weapon. As another example, select the target and/or weapon when a determination is made that the weapon is activated, being held, used, or engaged, or has a particular point of aim, such as being aimed at a user, a vehicle of a user, or a location of a user. As another example, select the target when the target is identified as being on a list of targets (such as utilizing facial recognition software to identify an individual whose name is stored as being a target).

Block 540 makes a determination as to whether the selected target is de-active.

For example, a determination is made as to whether the selected target and/or weapon is killed, neutralized, wounded, terminated, incapacitated, destroyed, struck, moved, no longer active, off, inoperable, non-threatening, etc.

If the answer to the determination in block 540 is "yes" then flow proceeds back to block 510. If the answer to the determination in block 540 is "no" then flow proceeds back to block 520.

For example, the target recommender identifies a person and/or an object as being a target, selects this person and/or object as the target, and provides this recommendation to an electronic device of a user. When the target becomes de-active per block 540, then flow proceeds back to block 510 and a new or different target is selected. For instance, a next active target is selected for the user. If the target is not de-active per block 540, then flow loops back to block 520 and the current target remains selected. For instance, the person and/or object selected remains selected until the person and/or object becomes de-active.

Block 530 makes a determination as to whether an action is requested.

For example, a determination is made as to whether another user requests assistance, another user receives fire from a weapon and/or target, a user receives instructions or actions to be completed, a target is selected for a user, or a factor or condition prioritizes or overrides a previous target selection.

If the answer to the determination in block 530 is "yes" then flow proceeds to block 520, and the target is selected. If the answer to the determination in block 530 is "no" then flow proceeds to block 550, and a target is selected based on one or more other factors (such as one or more factors discussed herein).

The target recommender processes, stores, provides, transmits, and/or displays a selected target. For example, an electronic device displays the target or indicia to recognize and/or distinguish the target to a user.

Consider an example in which a soldier has a rifle with an electronic scope that communicates with or includes a target recommender. The rifle, the electronic scope, and/or the target recommender determine that a combatant is located one hundred yards (100 y) from the soldier and is firing a weapon at the soldier. The target recommender selects this combatant as the target and provides this selection to the soldier, the rifle, the electronic scope, and/or an electronic device with the soldier. For example, an HPED with the soldier or the electronic scope displays the location of the combatant and the selection of the combatant as the current target. The combatant is prioritized as a target since the combatant is firing a weapon on the soldier and hence poses an immediate danger or threat to the soldier.

Consider further the example in which the soldier has the rifle with the electronic scope that communicates with or includes the target recommender. The soldier neutralizes the selected combatant, and no other people and/or weapons are firing at the soldier at this time. An electronic device of another soldier detects the presence of multiple combatants with small arms and other weapons and transmits an assist request to the electronic scope, HPED, and/or target recommender. The HPED with the soldier or the electronic scope of the soldier displays the assist request, the location of the multiple combatants, the location of the other soldier, and the selection of the multiple combatants as the current target. The multiple combatants are prioritized as a target in response to the assist request.

Consider further the example in which the soldier has the rifle with the electronic scope that communicates with or includes the target recommender. The target recommender determines that no weapons are being aimed or fired at the soldier and that no assistance requests are provided from other soldiers. The target recommender selects targets for the soldier and provides these selections based on one or more factors, such as distance from the soldier to a combatant, a weapon with or near a combatant, an identity of a combatant, movement of a combatant, an obstruction near a combatant and/or the soldier, or another factor discussed herein. For instance, satellite image analysis reveals two combatants are located two hundred yards away from the soldier in a compass direction of one hundred and ninety degrees (190°). The HPED of the soldier displays the location of these two combatants and the selection of them as the target. The display also displays a safe route or a path for the solider to take to a cover location that is closer to the selected two combatants. With this information, the soldier proceeds to the cover location to engage the two combatants.

Prioritization and/or selection of a target can be based on one or more factors that have varying degrees of scope, weight, priority, score, influence, instruction, etc. For example, FIG. 5 shows a method in which priority includes a hierarchy of first whether a target is active per block 510, second whether action is requested per block 530, and third based on another factor per block 550. These priorities, however, can be altered or re-arranged according to selection from a user and/or electronic device. For instance, blocks 510 and 530 can be switched to alter priority to include a hierarchy of first whether an action is requested, second whether a target is active, and third based on another factor. These priorities can be further altered or re-arranged, such as selecting one or more of the factors discussed herein to be included or represented per blocks 510 or 530.

FIG. 6 is a method to determine a recommendation for a target based on where a weapon fires.

Block 600 states determine, based on target information, a location and/or an identity of a weapon.

A target can include a weapon, be the weapon, or be proximate to the weapon. For example, a person holds or carries a firearm. As another example, a weapon mounts to a vehicle. As another example, a weapon (such as explosives) is located in a building. As another example, a weapon includes an automated or man-operated electronic apparatus or electronic system that fires a projectile.

An identity of the weapon can be a general identity or recognition (such as a determination that a weapon exists or likely exists) or a more specific identity (such as a determination that the weapon is a knife, a handgun, a rifle, a firearm, a rocket propelled grenade, etc.). The identity of the weapon can also include particular and/or distinguishing information (such as a determination of a make, a model, a size, a precise geographical location, and/or a shape of the weapon).

Block 610 states determine, based on the target information, one or more of whether the weapon is firing or will be firing, a point of aim of the weapon, and where the weapon is firing.

The target information can provide evidence or facts as to whether the weapon is currently firing or recently fired, will be firing (such as firing in the near or immediate future), a location to where a weapon is aimed (such as a direction of a point of aim), a location to where the weapon is firing or fired. By way of example, this target information includes, but is not limited to, a weapon having an elevated temperature or heat signature (such as a heated barrel), a weapon producing a noise or a flash (such as a noise and/or a flash associated with a firearm shooting a bullet), a weapon launching or firing tracer ammunition or rounds that are visible and detectable (such as a rifle firing tracer bullets or tracer ammunition), a weapon generating smoke (such as smoke plumes from a launch of a rocket or smoke released from a firearm when it fires a bullet), a weapon recoiling or moving upon being fired to indicate a direction of fire for the weapon (such as a rifle recoiling in an opposite direction of a line of departure of the bullet being fired), a point of aim of a weapon (e.g., determined from photo or video analysis), visual indications of an impact location of a projectile fired from a weapon (such as bullets hitting objects and making a sound upon impact of the object or leaving a visible mark at the impact location), observations from a user indicating firing or aiming of a weapon, and analysis of photographs or video of targets and/or weapons (such as object recognition software determining an existence of a weapon in a photograph or photogrammetry determining weapons, locations of impact locations of projectiles fired from the weapon, angles of lines of departure or lines of sight, trajectory paths, etc.).

Consider an example in which an electronic device takes photographs and/or video of a target and provides the photographs and/or video to a computer system, such as a computer vision system. The computer system executes object recognition to identify people, weapons, and points of aim of the weapons. By way of example, object recognition can include a method based on one or more of Computer Aided Design-like (CAD-like) object models (e.g., edge detection or primal sketch), appearance-based methods (e.g., use templates or exemplars of the objects to perform recognition), feature-based methods, and genetic algorithms.

Block 620 states determine a recommendation for the target based on the one or more of whether the weapon is firing or will be firing, the point of aim of the weapon, and where the weapon is firing.

Block 630 states provide the recommendation to a user and/or an electronic device.

For example, the recommendation is processed with a processor or processing unit, stored on memory, executed with a computer and/or electronic device, transmitted over a wireless network, displayed on a display of an electronic device, provided to a user and/or an electronic device, and/or shared between one or more electronic devices and/or users.

Consider an example in which a soldier carries an electronic device (such as an electronic scope mounted to a rifle) in a combat environment. The electronic device includes a camera that captures images in its field of view, a microphone that captures sound, a rangefinder that measures distances to objects, a clock, a memory that stores a target recommender, and a processor that executes the target recommender with collected target information from the camera, the microphone, the clock, and the rangefinder. The camera captures images of an unidentified person holding an object that emits a flash of light, and the rangefinder determines that the person and the object are 300 meters away. Approximately 0.88 seconds after the flash of light, the microphone detects a loud sound. The target recommender analyzes this target information and determines the following:

(1) A speed of sound at the geographical location of the electronic device is 340 meters per second (m/s). According to the clock in the electronic device, the loud sound occurred 0.88 seconds after detection of the flash of light. Given the formula of rate multiplied by time equals distance (Rate×Time=Distance), the distance from the emanation location of the sound at the flash point is 340 m/s×0.88 s which is 300 meters (the distanced determined by the rangefinder).

(2) The calculated distance of 300 meters from the sound coincides with the distance determined from the rangefinder that the person and object are 300 meters away. The likeness of these two numbers indicates that the loud sound likely originated from the flash location.

(3) The sound wave of the loud sound captured with the microphone is compared with stored sound waves, and this comparison reveals a pattern match with a sound of an AK 47 firing from approximately 300 yards away.

(4) An image of the flash of light from the object is examined to determine flash signatures, such as a size, a shape, a color, an intensity, and an illumination pattern of the flash of light. The flash signatures of the captured flash of light match a size, a shape, a color, an intensity, and an illumination pattern consistent with flash signatures of an AK 47 rifle firing toward an object. The flash signature of the flash of light from the object further indicates that the direction of aim of the AK 47 rifle is at or toward the camera that captured in the image. Further, a size of the flash is compared with stored flash sizes, and this comparison confirms that the flash size corresponds with a flash size from an AK 47 rifle at 300 meters.

(5) A speed of a bullet from an AK 47 rifle is approximately 715 meters per second (m/s). A time for a bullet to travel 300 meters is 0.42 seconds. If the object in the image were indeed an AK 47 rifle that fired at the electronic device, then the bullet would have passed or impacted 0.42 seconds after the flash (assuming the speed of light to be instantaneous with respect to the speed of sound).

(6) Sound waves captured with the microphone are examined at a point in time corresponding to 0.42 seconds after the time of the flash. These sound waves are compared with known sound wave patterns of bullets passing by an object. The comparison reveals a match that indicates a reverberation or sound did occur at that time.

(7) A thermal image of the person and the weapon are compared with known thermal images or thermal image data, and this comparison confirms a person holding a rifle that has been fired numerous times.

(8) Object recognition software determines, based on a size and shape of the object at the given distance (i.e., 300 m), that the object fits a profile of a rifle.

(9) Facial recognition software confirms that the image of the person holding the object is a person, though an identification (e.g., name) of the person is not available.

(10) An analysis of historical information reveals that six other electronic devices of other users have determined combatants firing AK 47 rifles within a radius of one kilometer of the electronic device and within the last three hours.

Based on this information, the target recommender determines that the person is a combatant and is holding a weapon (likely an AK 47 rifle). The target recommender further determines that the person is firing the weapon at the soldier of the electronic device and hence provides a priority recommendation to target the person and the weapon. A display of the electronic device of the soldier displays this recommendation and provides further collected information (such as a location of the person, a distance to the person, identification of the weapon of the person, and an indication that the person is firing at the soldier). An electronic scope on a rifle of the soldier automatically adjusts its reticules or cross-hairs to zero the scope for a target that is 300 meters from the soldier.

Analysis of an audio recording of a gunshot provides information as to a location of the weapon and speed and trajectory of a bullet fired from the weapon. For example, a shock wave from a bullet expands with a conical wave front that propagates at the speed of sound with a strongest sound level or amplitude along a direction of fire of the weapon. A direction of the propagating shock wave can be determined with two spaced microphones. For instance, these two microphones can be located on an electronic device (such as two spaced microphones on a rifle, on an electronic scope, or on a user) or two microphones at different locations (such as first microphone on an a rifle, on an electronic device, or on a user and a second microphone on another rifle, on another electronic device, or on another user).

Further, a propagating sound wave from a bullet has an inner angle (θ) given by the following formula:

θ=arcsin(1/$M$), where M is the Mach number given by velocity of the object divided by the velocity of sound (Vobject/Vsound or V/c, where c is the velocity of sound).

This equation further reveals that θ can be calculated when the speed of the object and the speed of sound are known. The speed of the object (e.g., bullets) can be determined from ballistic tables, and the speed of sound can be determined from sound tables for different geographical locations.

A bullet makes a distinct shockwave recording (e.g., a distinct wave shape) at given distances depending on, for example, reverberations. For example, a wave propagates with an "N" shape and with a length of several milliseconds such that the microphones record the original wave and a reflected wave (e.g., a reflected wave from ground surfaces).

Consider an example of an electronic device that includes a target recommender with a gunfire locator system that determines and conveys a location of gunfire. The system includes one or more microphones, one or more sensors (such as a optical or infrared sensor), memory that stores a gunfire location determiner, a processor, and a display and/or user interface. An optical and/or infrared sensor detects an optical flash of the weapon and/or frictional heat of the bullet through the air, and the microphone records a bullet bow shockwave (e.g., a sound of the projectile as it passes the microphone) and/or a muzzle blast (e.g., sound of the weapon as it fires the projectile). Based on this collected information, the gunfire locator system or target recommender determines a location of the weapon and a category, characteristic, and/or type of the weapon.

Various factors influence assignment of a user to one or more targets, and such factors can be static (such as a set list of factors) or dynamic (such as an evolving list of factors, scores, weights, calculations, instructions, etc.). For example, one or more factors change in real-time based on determined environmental data, target information, user information, etc.

Consider an example in which combat rules of engagement for a soldier state that a soldier cannot fire upon a combatant unless the combatant holds a firearm or weapon. If the combatant is not holding a firearm or weapon, the target recommender monitors the combatant as a target but does not authorize firing upon the combatant. If the combatant retrieves and holds a firearm or weapon, the target recommender alters the assignment instructions and authorizes firing upon the combatant. Subsequently, a target recommender changes the rules of engagement to state that a soldier can fire upon a combatant if either the combatant holds a firearm or a weapon or the combatant is identified as a confirmed combatant.

Additionally, the target recommender provides instructions based on activity of the combatant. For example, the target recommender determines a first combatant carrying a cold firearm (i.e., one that has not been recently fired) and determines a second combatant holding, aiming, and firing a hot firearm (i.e., one that is being fired or has been recently fired). Although both combatants have firearms, the second combatant poses a more serious risk or danger than the first combatant since the second combatant is firing the firearm. In response to these different activities and different threats, the target recommender assigns a higher priority to the second combatant or assigns different instructions to the second combatant than the first combatant.

Consider an example in which soldiers confront numerous combatants that are dispersed throughout an urban environment. Soldier A has an option to engage numerous different combatants that are proximate to him. A determination as to which combatant to engage may primarily be based on location or proximity (e.g., Soldier A should engage the closest combatant). The closest combatant, however, may not pose a greatest risk to soldier A since another combatant farther away may actually be aiming or firing a weapon at soldier A. The target recommender determines target information (such as points of aim and firing locations of the combatants) and assigns recommendations based on this target information. For example, soldier A is provided with a recommendation to target the other combatant since this combatant is aiming a weapon at soldier A even though this other combatant is farther away than other combatants. The target information used to make this recommendation is gathered from other soldiers in urban environment, surveillance data (such as data from satellites, drones, etc.), and other individuals.

Consider an example in which two hunters are hunting ducks together. In a first scenario, the two hunters do not utilize a target recommender. A flock of ducks flies overhead, and both hunters aim and fire their gun at the same duck. One duck is shot, but the two hunters are not sure who shot the duck. Now consider a second scenario in which the two hunters utilize a target recommender. A flock of ducks flies overhead, and both hunters aim their gun at the same duck. The target recommender analyzes images of the flock and points of aim of the two guns and determines that both guns are pointed at the same duck. The target recommender instructs the second hunter to move his point of aim to another duck so the two hunters do not have their points of aim on the same duck. In response to this recommendation, the second hunter moves his point of aim, and both hunters fire upon the flock. Each hunter shoots a different duck, and no discrepancy or confusion exists as to which hunter shot which duck.

Consider an example in which infantry soldiers are engaged in an active firefight with numerous combatants. Since many combatants and soldiers are firing, it is difficult for a soldier to determine which combatant is firing at which soldier. A target recommender collects target information from electronic devices of each soldier (e.g., electronic scopes, rifles with electronics, and wearable electronic devices) and other information sources discussed herein. The target recommender analyzes this information and determines locations of combatants, locations of the soldiers, weapons of the combatants, points of aim and firing locations of the combatants, rates of fire of the combatants and soldiers, distances between combatants and soldiers, movement of the combatants and soldiers, obstructions between the combatants and soldiers, and other information discussed herein. Based on this information, the target recommender prioritizes target recommendations among the soldiers. By way of example, soldier A receives a recommendation to target combatant 1 since this combatant is firing on soldier A, and soldier B receives a recommendation to target combatant 2 since this combatant is firing on soldier B. Soldier C receives a recommendation to target combatant 3 since this combatant is firing on soldier D, and soldier C has a better line of sight and higher likelihood to hit combatant 3. Soldier D is instructed to temporarily take cover next to an obstruction. Soldiers E and F receive recommendations to fire upon combatant 4 since this combatant is engaged in heavy arms fire. Soldier G receives a recommendation to launch a rocket propelled grenade at an entrance to a building since the target recommender confirmed that this entrance houses a large ammunition cash for the combatants.

Figure 7:
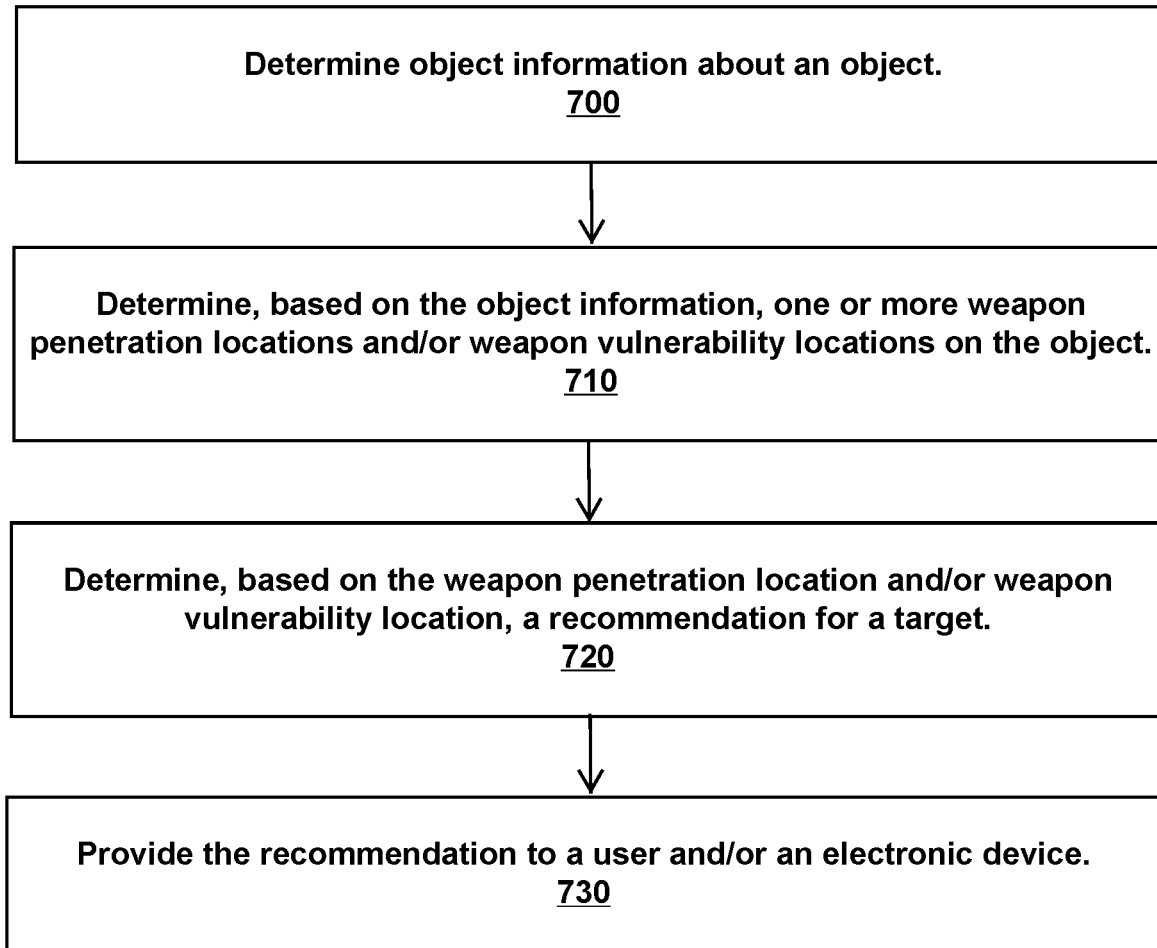
FIG. 7 is a method to determine a recommendation for a target based on object information in accordance with an example embodiment.

FIG. 7 is a method to determine a recommendation for a target based on object information.

Block 700 states determine object information about an object.

By way of example, object information includes, but is not limited to, an identity of the object (e.g., identifying an object as a tree, a building, a vehicle, a structure, etc.), a size of the object, a shape of the object, a location of the object, a condition of the object (e.g., new, old, partially destroyed, damaged, functional, etc.), an image or video of the object, technical specifications about the object, instructions about the object, data or information about the object, blueprints of the object, engineering drawings of the object, specifications of the object, a proximity or location of the object with respect to a user and/or a target, movement and/or activity of the object, a kind of the object (e.g., a make and/or model of the object), and purpose or function of the object.

Block 710 states determine, based on the object information, one or more weapon penetration locations and/or weapon vulnerability locations on the object.

The object information provides information about where an object is susceptible to be penetrated, perforated, punctured, pierced, or passed through with a projectile fired from a weapon. This information includes locations where an object is compromised or unfit as a cover or as an obstruction (such as an object providing cover from incoming fire or cover for a person to remain covert). The object information also provides information where an object or a person or thing on, in, or near the object can be observed, surveyed, or seen by another person or an electronic device.

With regard to the weapon penetration location and/or weapon vulnerability location, an example embodiment determines a size of the location, a shape of the location, a location on the object, material composition of the location, and other information (such as a percentage, probability, or likelihood of a projectile penetrating a certain location on the object).

In an example embodiment, a weapon penetration location and/or a weapon vulnerability location includes locations on, in, and/or near an object that are susceptible to fire from a weapon or surveillance from a person or an electronic device. For example, the weapon vulnerability location includes locations where fire from a weapon previously occurred, is occurring, or could occur in the future. For instance, an area between two buildings is within a field of view of a combatant and/or within range of a weapon of a combatant. This area is a weapon vulnerability location. As another example, the weapon penetration location includes locations into which or through which a projectile can penetrate and harm a user at the location. For instance, a wall between a user and a combatant is a weapon penetration location if a bullet fired from a gun of the combatant can pass through the wall and strike the user.

Block 720 states determine, based on the weapon penetration location and/or weapon vulnerability location, a recommendation for a target.

By way of example, the recommendation includes, but is not limited to, fire on the target, stop or no fire on the target, priority of the target, analysis of the target and/or object, locations of the weapon penetration location and/or weapon vulnerability location, suitability of the object as cover from incoming fire, and other recommendations discussed herein.

Block 730 states provide the recommendation to a user and/or an electronic device.

For example, the recommendation is processed with a processor or processing unit, stored on memory, executed with a computer and/or electronic device, transmitted over a wireless network, displayed on a display of an electronic device, provided to a user and/or an electronic device, and/or shared between one or more electronic devices and/or users.

An example embodiment displays weapon penetration locations and/or weapon vulnerability locations on or through an electronic device. For example, a target recommender determines certain windows and walls of a building are penetrable and/or vulnerable with a bullet fired from a rifle. These windows and walls are highlighted on a display to visually distinguish them from other windows, other walls, or other locations that are not penetrable and/or vulnerable from weapons. As another example, a target recommender determines that an outdoor area can be hit with fire from a sniper with a gun. Wearable electronic glasses of a user display a 3D zone in a field of view of the user that coincides with this area. The user can see on or through the display boundaries of the area (such as length, width, and height of this area) so the user knows where the area starts and stops.

A recommendation of a target to a user includes a factor of object information. By way of example, this object information includes an object or an obstruction that is located near, with, or between a user and/or a target. Further, a type of the object and its physical characteristics (such as size, shape, location, material composition, structural integrity, etc.) influence or affect recommendations and/or assignments of users to target. For example, an object with multiple large weapon penetration locations would score differently (e.g., worse) as a cover location than another object with small or no weapon penetration locations. Further, scores or priorities for objects and/or obstructions can be based on a type of the obstruction, weapon penetration locations, weapon vulnerability locations, physical characteristics of the object, and other factors and information.

Consider an example in which two automobiles are located near a building and a soldier seeks to take cover at one of these vehicles. A target recommender analyzes these two automobiles, identifies a make and model of the automobiles, and further determines weapon penetration and vulnerability locations as follows. A first one of these automobiles is a sedan with windows that are broken out (i.e., gone or missing). The target recommender determines angles and locations of potential or actual fire from combatants, and determines that these windows diminish thirty percent (30%) of the cover area of the automobile for the soldier. A second one of these automobiles is a pickup truck with no visible structural damage. Given the wheel sizes, the pickup truck however, is elevated from the ground and hence includes a large, open area under the vehicle. Given the angle and direction of known combatants, the target recommender determines that seventy percent (70%) of the total area of the vehicle cover (i.e., where the soldier would seek cover) is vulnerable to incoming fire from weapons. For example, bullets can pass under the pickup truck from the firing side to the other side (i.e., the cover side) and potentially strike the soldier seeking cover. The target recommender recommends that the soldier move to the automobile instead of the pickup truck since the automobile has a larger safe zone or larger area of cover.

Consider an example in which object recognition software of a target recommender determines an identity of several different objects. This identity includes a size of the object, a shape of the object, an approximate weight of the object, material from which the object is made or fabricated, a location of the object, and weapon penetration locations or weapon vulnerability locations. Ballistic analysis with respect to the objects further determines whether a projectile fired from a weapon can penetrate into or through the object (e.g., penetrate through the object and strike a person on the other side of the object).

In an example embodiment, a target recommender analyzes ballistic information (including terminal ballistics) and object information to determine whether a projectile can penetrate an object. For example, terminal ballistic information provides information on impact depths of a bullet from a rifle (such as an AK 47 rifle) on various types of objects and materials. This information is stored and retrieved in order to calculate weapon penetration locations (e.g., where a bullet can pass through the object) and weapon vulnerability locations (e.g., where a bullet could or possibly pass through the object).

By way of example, an approximation of impact depth (D) of a bullet is given according to the following equation:

$$D = L(A/B),$$

where L is a length of the projectile, A is a density of the projectile material, and B is the density of the material of the target.

Consider an example in which a target recommender analyzes photos of a target and determines that the target includes an AK 47 rifle. Although the target recommender may not know the exact rounds being fired from the AK 47 rifle, the target recommender can determine, estimate, or approximate impact depths on various objects based on standard or known ammunition for the AK 47 rifle. Alternatively, a user finds or captures a target with an AK 47 rifle, determines the ammunition being used, and provides this information to the target recommender.

Consider an example in which soldiers engage combatants with firearms in an urban environment. A target recommender determines that a first combatant fires a firearm at the soldiers from inside of a house. The target recommender further determines that walls of houses in this geographical area are typically made from wood and drywall. Given the distance of the soldiers from the first combatant and ballistics information of the ammunition and the firearms of the soldiers, the target recommender determines that bullets fired from rifles of the soldiers can penetrate through walls and windows of the house and strike the first combatant located inside of the house. These locations are recorded as weapon penetration locations and displayed and/or provided to the soldiers. For example, electronic devices of the soldiers display a recommendation to fire at first combatant and further display the weapon penetration locations on the house to the soldiers.

Consider the example in which the soldiers engage the combatants with firearms in the urban environment. A second combatant drives an armed vehicle. The target recommender receives images of the vehicle, analyzes the images, determines a make and model of the vehicle, and retrieves specifications for the vehicle. The specifications include weapon penetration locations that show where the vehicle is susceptible or vulnerable to small arms fire. The target recommender displays these weapon penetration locations on a display of wearable electronic glasses of a soldier. For example, 2D or 3D images of the weapon penetration locations overlay on the display on the actual vehicle and remain on these locations as the vehicle moves. When the soldier looks at the vehicle, the images are overlaid on the vehicle so the soldier knows where to aim and fire his weapon to strike the weapon penetration locations on the vehicle.

Consider the example in which the soldiers engage the combatants with firearms in the urban environment. Some of the soldiers receive an excessive amount of incoming fire. The target recommender determines two possible cover locations that are proximate but not readily visible to the soldiers. A first location consists of a long stonewall, and a second location consists of a shed. The target recommender analyzes images of these to cover locations and determines that the stone wall is structurally intact, approximately five feet tall, and six to eight inches thick; and the shed is formed from sheet metal. Based on this object information and a determination of impact depths, the target recommender displays recommendations or alerts to the soldiers to take cover at the stonewall.

An electronic device of one of the soldiers displays a map that shows a location of the stonewall and a path to move from his current location to a location at the stonewall.

Figure 8:
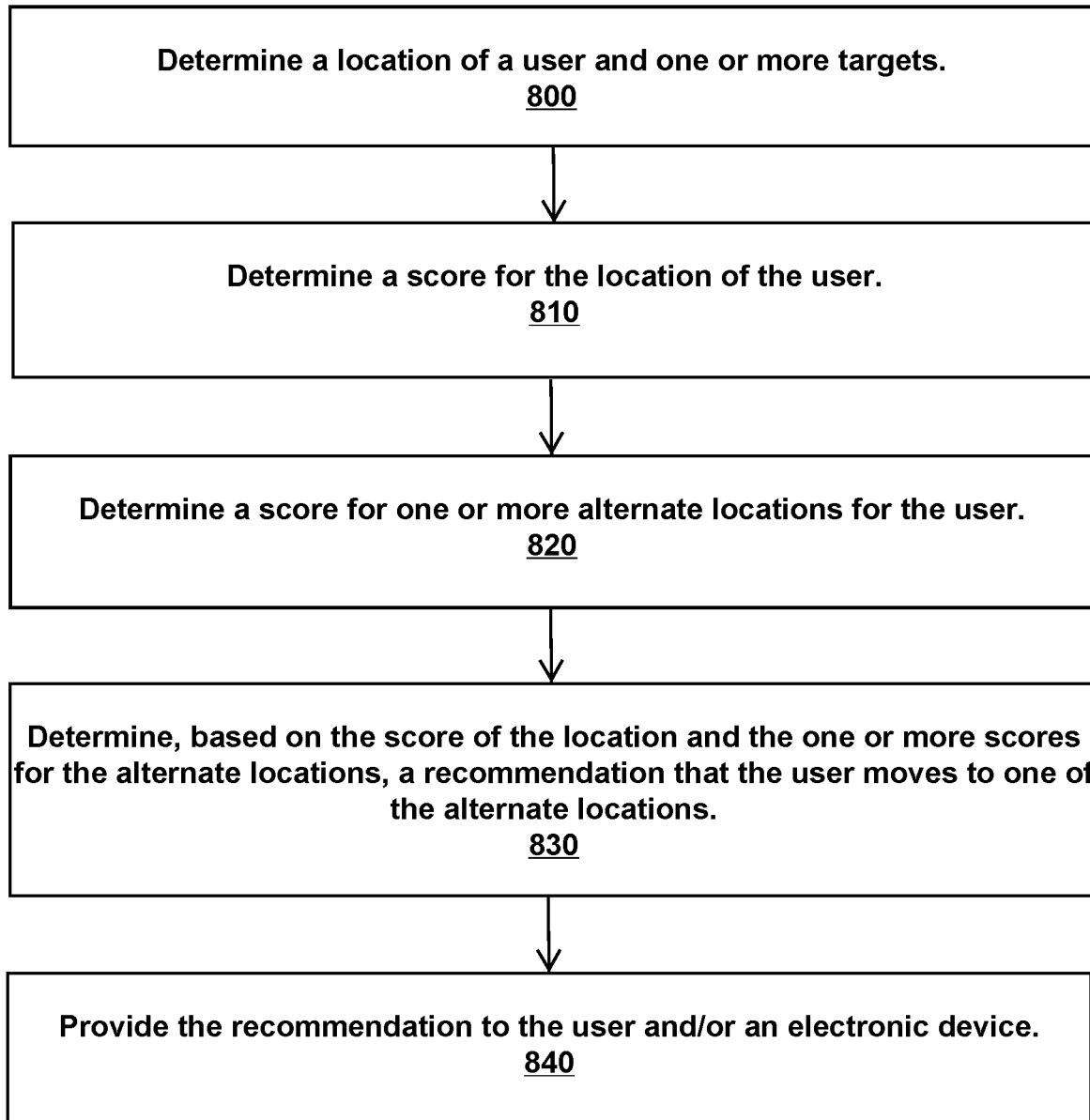
FIG. 8 is a method to determine a recommendation to move to an alternate location in accordance with an example embodiment.

FIG. 8 is a method to determine a recommendation to move to an alternate location.

Block 800 states determine a location of a user and one or more targets.

An example embodiment determines a location of one or more users, targets, weapons, and/or objects at a geographical location and stores these locations. For example, a distance between each user and each other target is determined and stored, and a determination is made of angles, objects, and/or obstructions between each user and each other target. These locations and this information are stored and mapped to a map.

Block 810 states determine a score for the location of a user.

The score is based on one or more of target information, user information, object information, weapon information, and the determination of the location of one or more users, targets, weapons, and/or objects at the geographical location.

Block 820 states determine a score for one or more alternate locations for the user.

The score is based on one or more of target information, user information, object information, weapon information, and the determination of one or more of the location of users, targets, weapons, and/or objects at the geographical location.

Block 830 states determine, based on the score of the location and the one or more scores for the alternate locations, a recommendation that the user moves to one of the alternate locations.

For example, the scores are compared, contrasted, examined, processed, and/or subject to one or more statistical or probability calculations or processes.

Block 840 states provide the recommendation to the user and/or an electronic device.

For example, the recommendation is processed with a processor or processing unit, stored on memory, executed with a computer and/or electronic device, transmitted over a wireless network, displayed on a display of an electronic device, provided to a user and/or an electronic device, and/or shared between one or more electronic devices and/or users.

An example embodiment determines a safety score for a user at his current geographical location and a safety score for a plurality of other geographical locations that are proximate to the user. A safety score represents or indicates a level, degree, or amount of safety of a user at a location. For example, this score represents a probability or likelihood of a user receiving or incurring harm from a target and/or weapon at the location (e.g., the user being hit with a projectile or fired at with a weapon while at the location). As another example, this score represents a probability or likelihood of a being or remaining undetected by a target at the location (e.g., the user being unseen or unnoticed while at the location).

The safety scores are based on determining at each location one or more of a distance from a location to each target and/or user, a distance from a location to each object (including each weapon), an obstruction at each location (including a size, shape, material composition, weapon penetration locations, weapon vulnerability locations, and structural integrity of each obstruction), impact depths of a projectile, obstructions along a line of sight from the location to a target, whether a location is receiving or has received fire from a target and/or weapon, a rate of fire a location is receiving or has received from a target and/or weapon, an angle from the location to each target and/or weapon, and other factors discussed herein.

Consider an example in which ground troops equipped with electronic devices discussed herein engage combatants in an urban environment. A soldier positions himself behind a tree and fires at combatants located near him. A target recommender collects or receives target and user information that includes distances to each combatant within firing range of a current location of the soldier, distances to each combatant within firing range of alternate locations of the soldier, angles from the current location and the alternate locations to the locations of the combatants within firing range of the soldier, weapons of the combatants in this firing range, structures, objects, and/or obstructions at the current location, the alternate locations, and the locations of the combatants, weapon penetration locations and/or weapon vulnerability locations of the current location and the alternate locations, obstructions and/or objects between the locations of the combatants and the current location and the alternate locations, where the current location and alternate locations are receiving or received incoming fire from the locations of the combatants, locations and/or movement of other users (e.g., other soldiers), impact depths of objects at various alternate locations, and other information discussed herein. Based on this information, the target recommender determines a recommendation as to whether the soldier should remain at the tree or move to a different location.

Figure 9A:
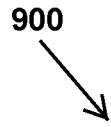
FIG. 9A is a score table for a factor of an obstruction in accordance with an example embodiment.

FIG. 9A is a score table 900 for an obstruction. The obstruction can be evaluated, scored, prioritized, assessed, or analyzed in view of one or more factors or conditions. By way of example, table 900 shows nine factors that include identification (a name or identity of an obstruction, such as a vehicle, a bridge, a tree, a building, etc.), dimensions (a size of the obstruction, such as length, width, and height), shape (such as rectangular, elongated, short, tall, oval, etc.), material (such as wood, polymer, steel, etc.), angle/elevation (such as an angle from the obstruction to one or more targets or a difference in elevation of the obstruction versus one or more targets), structural integrity (such a new, compromised, fully intact, partially intact, damaged, etc.), history (such as previous uses of this obstruction or like obstructions as cover), and weapon penetration locations (including impact depths of projectiles on the obstruction). Each factor also includes a score, priority, evaluation, and/or instruction (shown in the table as O1-O9).

Figure 9B:
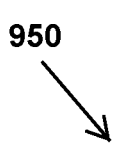
FIG. 9B is a score table for a factor of weapon penetration locations in accordance with an example embodiment.

Each factor in a table can be further evaluated, scored, prioritized, etc. By way of example, FIG. 9B shows a score table 950 for the factor Weapon Penetration Locations (shown as the ninth factor in table 900).

Table 950 shows six factors that include shape (such as rectangular, elongated, short, tall, oval, etc.), size (such as measured in centimeters, inches, feet, yards, meters, etc.), number (such as a number of different locations that can be penetrated with a weapon), percent surface area (such as an amount of surface area of the obstruction that includes weapon penetrations locations versus a total amount of surface area or an amount of surface area that does not include a weapon penetration location), and unknown. Each factor also includes a score, priority, evaluation, and/or instruction (shown in the table as W1-W6).

Consider an example in which a soldier engages combatants with a rifle while being one hundred and fifty meters (150 m) to two hundred meters (200 m) away from the combatants. The soldier fires at the combatants from behind a building. A target recommender evaluates the current location of the soldier and current obstruction or cover (i.e., the building) and compares this location and obstruction with alternate locations and obstructions. The building has a low safety score as a vantage point to engage the combatants since it is damaged, includes multiple entrances through which a combatant could enter, and has numerous weapon penetration locations through which combatant bullets can penetrate. The target recommender determines several abandon vehicles that are located one hundred meters (100 m) to about one hundred and fifty meters (150 m) from the combatants. These vehicles have a higher safety score as a vantage point to engage the combatants since they are structurally sound, have few weapon penetration locations from small arms fire from the combatants, offer improved lines of sight to the combatants, and have no blind spots to receive fire from the combatants. The target recommender provides the soldier and/or an electronic device of the soldier with a recommendation to move to the vehicles to engage the combatants. For example, a display on the electronic device displays a map and/or a path from the current location of the soldier to the vehicles.

Figure 10:
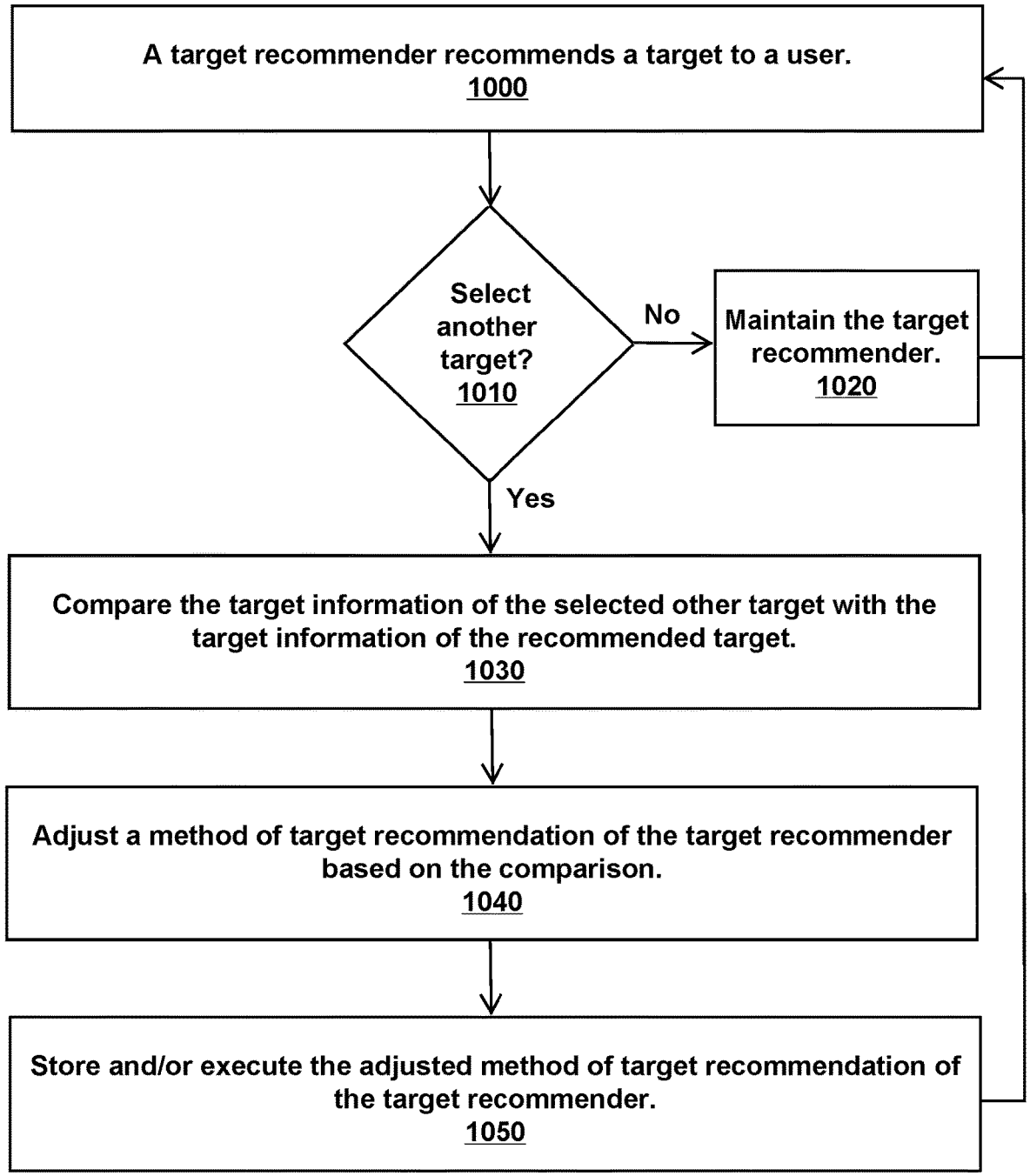
FIG. 10 is a method to adjust a target recommender based on user selection of targets in accordance with an example embodiment.

FIG. 10 is a method to adjust a target recommender based on user selection of targets.

Block 1000 states a target recommender recommends a target to a user.

For example, the target recommender recommends the target to the user in accordance with one or more example embodiments discussed herein. The recommendation can be or include an action or instructions (such as a recommendation to move to a different location or instructions to assist another user).

Block 1010 makes a determination as to whether the user selects another target different than the recommended target. If the answer to this determination is "no" and the user selects the recommended target, flow proceeds to block 1020. If the answer to this determination is "yes" and the user selects another target different than the recommended target, flow proceeds to block 1030.

Block 1020 states maintain the target recommender. For instance, no changes, adjustments, alterations, or modifications are made to the target recommender. Flow proceeds from block 1020 back to block 1000.

Block 1030 states compare the target information of the selected other target with the target information of the recommended target.

For example, the target recommender compares one or more of a factor, score, instruction, priority, weight, and other target information of the selected other target with the recommended target.

Block 1040 states adjust a method of target recommendation of the target recommender based on the comparison.

For example, a change, an adjustment, an alteration, or a modification is made to one or more of an algorithm of the target recommender, a subroutine or programming code of the target recommender, an order or priority of instruction or execution of the target recommender, and a factor, a score, an instruction, a priority, or a weight of the target recommender and/or the target information.

Block 1050 states store and/or execute the adjusted method of target recommendation of the target recommender. Flow proceeds back to block 1000.

Consider an example in which a target recommender receives target information, user information, and object information and builds a model or an algorithm based on this input information. The target recommender executes this model or algorithm to make predictions (such as recommendations for target selection, weapon selection, movement locations, obstructions or cover, etc.). Further, the model or algorithm can change in real-time based on receipt of additional information.

Consider an example in which the target recommender determines information and based on this information builds an algorithm that includes executable programmable software code (such as code to execute a method discussed herein or a variation thereof). The algorithm assigns or recommends targets a first priority to a user based in part on whether the targets are aiming and/or firing a weapon at the user. The algorithm assigns or recommends targets a second priority to a user based in part on whether the targets are aiming and/or firing a weapon at another user (such as users in a group or a particular user in a group). In spite of these assignments or recommendations, users frequently select a target aiming and/or firing at another user over a target aiming and/or firing at the user. The target recommender learns from this data and alters or changes the algorithm. This altered algorithm assigns or recommends targets a first priority to a user based in part on whether the targets are either aiming and/or firing a weapon at the user or aiming and/or firing a weapon at another user. In this example, the target recommender executes machine learning to modify an algorithm that recommends targets to users.

Machine learning enables a computer program of an example embodiment to learn from experience (e.g., determined target data) with respect to different tasks (e.g., users engaging targets) and different performance measures (e.g., whether the tasks were successfully completed). The performance measures improve over time as new or more data are determined.

Consider an example of supervised learning in which a recommender is provided with example inputs (such as target information relating to factors discussed herein) and provided with desired or acceptable outputs of the example inputs (such as determinations as to whether a target should have been engaged, a user should have moved, a location to engage a target, etc.). The recommender makes predictions based on known properties learned from the example inputs (e.g., training data or a learning data set). The recommender further builds and/or updates algorithms and models (such as methods discussed herein) to generate improved predictions for new input data.

Example embodiments are not limited to supervised learning, but include other learning methodologies, such as unsupervised learning, reinforcement learning, and semi-supervised learning.

In an example embodiment, a recommender predicts a rating and/or a preference that one or more users would give to an item or an action. The recommender can select the item or the action for the user based on one or more of a prediction of what the user would select, a prediction of what other users would select, and a prediction of what the user should select. Recommendations can be based on collaborative filtering (such as building a model or algorithm from past behavior, activities, and preferences of one or more users), content-based filtering (such as determining discrete characteristics of an action or an item and recommending additional actions or items with similar characteristics), or a hybrid approach that combines collaborative filtering and content-based filtering.

Consider an example in which a target recommender recommends locations to where a user can move for cover or protection from incoming combatant fire from a weapon. The target recommender retrieves images of objects or obstructions as possible location to where the user can move. Physical properties of the object or obstruction (such as size, shape, integrity, material composition, location, identity, impact depth, etc.) are compared with object or obstructions with similar physical properties (e.g. stored in a database). A determination is made as to whether these previous objects or obstructions provided adequate protection for the user. For instance, one or more factors of such obstruction are determined (such as whether previous users were struck with incoming fire, a length of time the user stayed at the location, incoming firing rate at the location, outgoing firing rate at the location, weapon penetration locations of the obstruction, successful target engage from the obstruction, etc.). Physical properties of the objects and obstructions can also be compared with physical properties of objects and obstructions previously selected by other users.

FIGS. 11A-11C show an example of machine learning for a target recommender that determines information for a target, recommends a target and/or an action to a user, and adjusts its recommendations based on actions of the user with regard to recommended targets.

FIG. 11A shows target data for a target (Target 1) selected by a target recommender for a user. Table 1100 includes various factors (shown in a first column) and data determined for the factors (shown in a second column) with regard to a user and a recommended target (Target 1). The factors and data for the recommended target include the following: a distance to target is 100+m; a weapon of the target is a rifle; the target is partially obstructed; yes the target has fired his weapon; yes the target is confirmed; no special instructions exist with regard to the target; no collateral damage will occur if the user fires his weapon on the target; and the target is located in geographical Area 1.

Based on the target information in table 1100, the target recommender recommends Target 1 to the user. The user, however, does not select Target 1, but instead selects Target 2. For example, instead of aiming and firing his weapon on Target 1, the user aims and fires his weapon on Target 2.

The target recommender analyzes or examines the target information and determines why the user selected a target (i.e., Target 2) over the recommended target (i.e., Target 1). This analysis or examination includes comparing the target data for Target 1 versus the target data for Target 2. The target data for Target 1 is shown in FIG. 11A, and the target data for Target 2 is shown in FIG. 11B. FIG. 11B shows target data for a target (Target 2) that was selected by the user but not recommended to the user by the target recommender. Table 1110 includes various factors (shown in a first column) and data determined for the factors (shown in a second column) with regard to the user and the selected target (Target 2). The factors and data for the selected target include the following: a distance to target is 100+m; a weapon of the target is a rifle; the target is partially obstructed; yes the target has fired his weapon; yes the target is confirmed; no special instructions exist with respect to the target; no collateral damage will occur if the user fires his weapon on the target; and the target is located in geographical Area 3.

A comparison of the factors and data for table 1100 in FIG. 11A versus the factors and data for table 1110 in FIG. 11B reveals that the data for the recommended target is similar to the data for the selected target. The tables have common or equivalent data in seven factors (distance to target, weapons, obstructions, fired weapon?, target confirmed?, special instructions?, and collateral damage). The tables have different data in one factor (location).

For illustration purpose, assume that the eight factors listed in tables 1100 and 1110 are the primary factors the user considered to determine a target. Since seven of the factors for the two targets are similar, selection of Target 2 over Target 1 was based on the eighth factor (location).

FIG. 11C shows tables for priorities assigned to the eighth factor (location). The areas (shown as Area 1-Area 5) represent different geographical areas or locations where the targets are located. For example, the areas could represent different structures (such as buildings or houses), different GPS coordinates, different map locations, different areas (such as different city blocks, different portions of a village, different areas in an airport, different geographical locations across a valley and adjacent mountain, etc.). A priority is assigned to each area for targets.

Table 1120A shows priorities assigned to targets in the five different areas (Area 1-Area 5). The target recommender used these priorities to assist in determining the recommendation of Target 1 to the user. As shown in table 1120A, the priorities are assigned as follows: Area 1 has a first priority; Area 3 has a second priority; Area 4 has a third priority; Area 2 has a fourth priority; and Area 5 has a restricted priority meaning the target recommender cannot recommend targets located in this area.

During target determination and recommendation, the target recommender determined and analyzed data in table 1100 of FIG. 11A and table 1120 of FIG. 11B. The target recommender selected Target 1 over Target 2 because Target 1 was located in Area 1 with a location priority per table 1120A of FIG. 11C of "First" priority, whereas Target 2 was located in Area 3 with a location priority per table 1120A in FIG. 11C of "Second" priority. Target 1 was selected over Target 2 because Target 1 had a higher or greater location priority than Target 2.

Since the user selected Target 2 over Target 1 and since these two targets were equivalent except for their locations, the user prioritized a target in Area 3 over a target in Area 1. This prioritization, however, conflicts or does not coincide with the priorities per table 1120A in FIG. 11C. The target recommender determines that the priorities in table 1120A are not correct. Specifically, selection of Target 2 in Area 3 over recommended Target 1 in Area 1 signifies that the user prioritizes a target in Area 3 over a target in Area 1 (assuming for discussion that other factors are equivalent).

Based on this comparison and discovered difference, the target recommender adjusts the priorities assigned to different areas to coincide with the determination that the user prioritizes targets in Area 3 over targets in Area 1. Table 11208 in FIG. 11C shows an adjustment or change to the priorities to the different areas. Area 3 is moved up to a higher "First" priority, and Area 1 is moved down to a lower "Second" priority when compared with the priorities for these two areas in table 1120A. This adjustment in priorities reflects the preference of the user for targets in Area 3 over targets in Area 1.

In subsequent target recommendations, the target recommender consults table 11208 in FIG. 11C for priorities with regard to targets in the areas. This adjustment or change to the priorities for areas shown in FIG. 11C improves the quality and accuracy of target recommendations made by the target recommender for the user.

FIGS. 11A-11C illustrate an example of an adjustment or modification to a single factor (location of a target) from a single user. Such adjustments and modifications, however, can occur for multiple factors (such as the factors discussed herein) and for multiple users. For example, the target recommender continuously, continually, or periodically makes adjustments in real-time to its methodology in recommending targets for users based on one or more of preferences of a user, feedback or input from a user, selection of a target by a user, non-selection of a target by a user, recommendation of a target to a user versus selection of a target by the user, changes to target information, changes to user information, and changes to object information.

Adjustments to a target recommender can be stored and executed for a particular user. For example, each user has his or her own personalized target recommender that includes personal preferences of the user. Adjustments to a target recommender can be stored and executed for a group of users. For example, multiple different users contribute to changes to a target recommender for the group.

Consider an example in which a machine-learning target recommender recommends a target (a person) to a user based on factors that include, but are not limited to, a distance from the user to the target and an obstruction between the user and the target. In spite of this recommendation, the user selects a different person as a target. For example, the user aims and fires a firearm at the different person as opposed to the recommended person. In response to the user selecting a target different than the recommended target, the target recommender evaluates target information and/or factors of the recommended person versus target information and/or factors of the different person (i.e., the person selected by the user as the target). This evaluation includes, but is not limited to, the following: comparing the distance from the user to the recommended target to the distance from the user to the selected target, and comparing a size, shape, location, and composition of obstructions between the user and the recommended target with obstructions between the user and the selected target. Based on these comparisons and discovered differences, the target recommender changes methods, procedures, or priorities for how targets are assigned to the user based on distances from the user to the targets and obstructions located between the user and the targets.

Figure 12A:
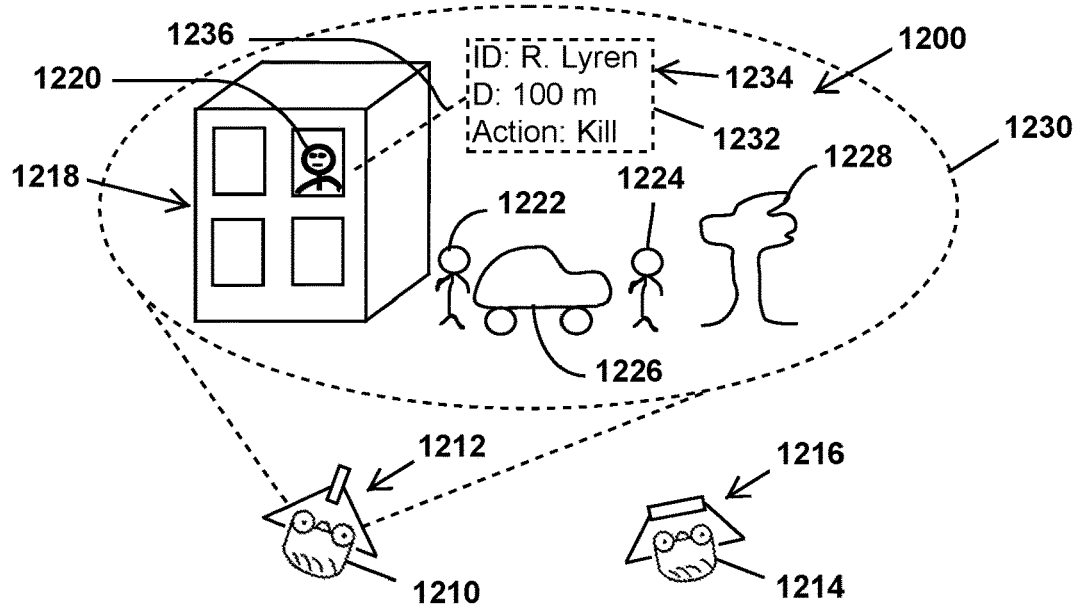
FIG. 12A is a field of view of a first user and/or first electronic device at a geographical location in accordance with an example embodiment.
Figure 12B:
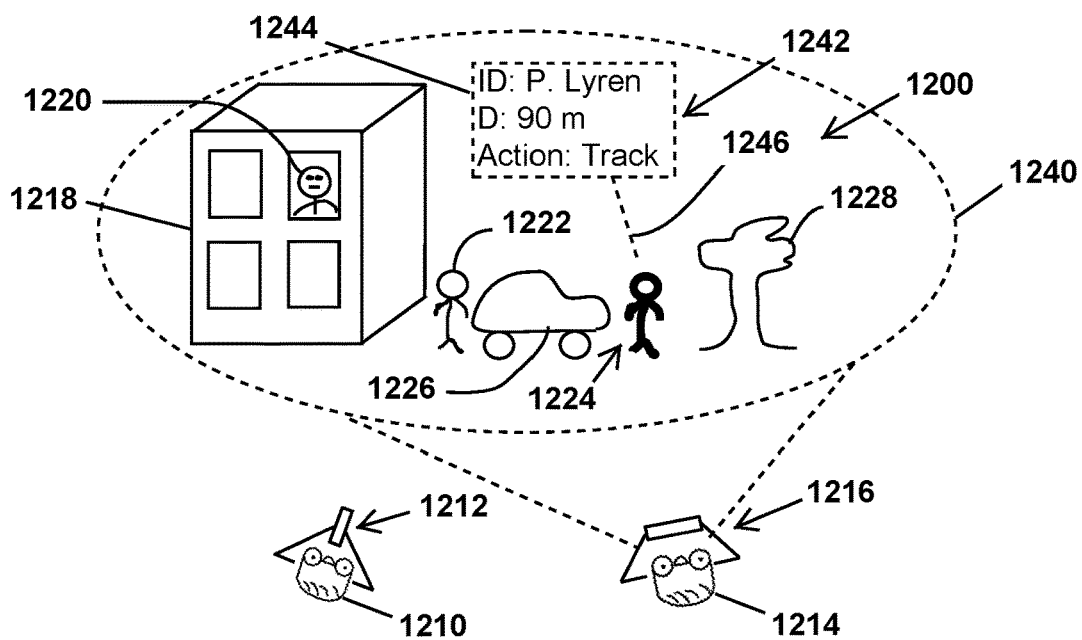
FIG. 12B is a field of view of a second user and/or second electronic device at the geographical location in accordance with an example embodiment.

FIGS. 12A and 12B show targets being recommended to users in a field of view of the users and/or electronic devices of the users. The figures show a geographical location 1200 that includes a first user 1210 with one or more electronic devices 1212 and a second user 1214 with one or more electronic devices 1216 that are viewing or monitoring a building 1218 with a person 1220 in a window of the building and two other people 1222 and 1224 near an automobile 1226 and a tree 1228.

FIG. 12A shows a field of view 1230 of user 1210 when this user and/or one or more electronic devices 1212 look at, monitor, or sense the geographical location 1200. The field of view 1230 of the user 1210 shows the person 1220 visually identified as a target on or thru a display of one of the electronic devices 1212. For example, the person 1220 is highlighted or accented with color or light to distinguish the person 1220 from other people (such as people 1222 and 1224) and other objects (such as building 1218, automobile 1226, and tree 1228) in the field of view 1230. The one or more electronic devices 1212 also display instructions and/or information 1232 to the user 1210.

The instructions and/or information 1232 include an identification (ID) of the target (shown as "ID: R. Lyren"), a distance (D) to the target (shown as "D: 100 m"), and an action to take on the target (shown as "Action: Kill"). By way of example, the instructions and/or information 1232 are shown in a box 1234 that includes a tail or extension 1236 that extends between the box 1234 and the target (i.e., person 1220). The tail 1236 visually identifies or shows that the information in the box 1234 belongs to or is associated with person 1220.

FIG. 12B shows a field of view 1240 of user 1214 when this user and/or one or more electronic devices 1216 look at, monitor, or sense the geographical location 1200. The field of view 1240 of the user 1214 shows the person 1224 visually identified as a target on or thru a display of one of the electronic devices 1216. For example, the person 1224 is highlighted or accented with color or light to distinguish the person 1224 from other people (such as people 1220 and 1222) and other objects (such as building 1218, automobile 1226, and tree 1228) in the field of view 1240. The one or more electronic devices 1216 also display instructions and/or information 1242 to the user 1214.

The instructions and/or information 1242 include an identification (ID) of the target (shown as "ID: P. Lyren"), a distance (D) to the target (shown as "D: 90 m"), and an action to take on the target (shown as "Action: Track"). By way of example, the instructions and/or information 1242 are shown in a box 1244 that includes a tail or extension 1246 that extends between the box 1244 and the target (i.e., person 1224). The tail 1246 visually identifies or shows that the information in the box 1244 belongs to or is associated with person 1224.

This tails or extensions 1236 and 1246 identify the boxes 1234 and 1244, information, and/or instructions as belonging to or being associated with the identified target (as opposed to belonging to or being associated with another person and/or object at the geographical location 1200). By way of example, these tails or extensions are not limited to a line or pointer but further includes indicia and/or visualizations that performs one or more of: following the target as the target moves, tracking the target as the target moves, emanating from the target, pointing to the target, distinguishing the target from other people and/or objects, identifying the target, and associating information and/or instructions with the target.

Users 1210 and 1214 can easily and quickly determine an existence and location of their respective target since the target is visually distinguished in the field of view of the user. The users are also less likely to become confused as to which target is assigned or recommended to them as opposed to another target since the assigned or recommended target is visually distinguished to the user. For example, while both users 1210 and 1214 look at the same geographical location 1200, user 1210 sees person 1220 identified and/or distinguished as the target whereas user 1214 sees person 1224 identified and/or distinguished as the target. Each user sees a different target while looking at the same geographical location at the same time.

In an example embodiment, a 2D or 3D image of the target is displayed on, over, or with the target. For example, an image of the person 1220 is displayed in a field of view of the user 1210 where the person 1220 is actually located in the building, and an image of the person 1224 is displayed in a field of view of the user 1214 where the person 1224 is actually located in the building. The image of the person can resemble the actual person. For instance, a target recommender draws a 3D image of the person to resemble a photograph or an actual image of the person and displays this 3D image at a location in a field of view where the person is actually located at a geographical location.

Consider an example in which users 1210 and 1214 have respective electronic devices 1212 and 1216 that include wearable electronic glasses that the users wear and a rifle with an electronic scope that communicates with the electronic glasses. The electronic glasses and electronic scopes determine target information and communicate this information with a target recommender that provides the users and/or electronic devices of the users with recommendations as to targets, actions to perform, and information. When a user looks at the geographical location through the electronic glasses or through the electronic scope, the user sees his or her respective target visually distinguished and identified in a field of view. For example, user 1210 sees the field of view 1230 shown in FIG. 12A, and user 1214 sees the field of view 1240 shown in FIG. 12B.

The electronic devices display and/or provide information and/or instructions to the users that include identification of the target, distance to the target, and action to take with regard to the target. Other information and/or instructions can be included on or thru the display, such as factors, scores, instructions, target information, user information, and/or object information discussed herein.

Consider an example in which an electronic device displays additional information to a user. By way of example, this additional information includes a compass direction to the target (such as 270°) and environmental conditions (such as wind direction and wind speed).

Figure 13A:
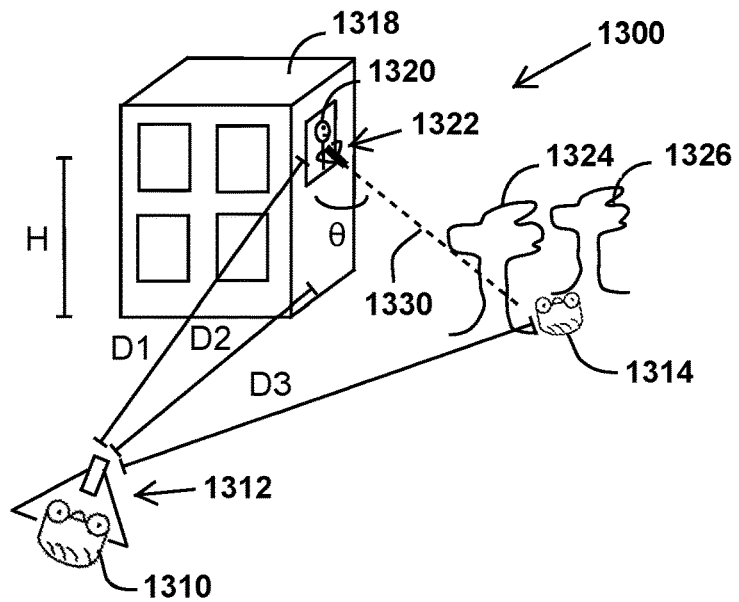
FIG. 13A shows an electronic device determining target information on a target in accordance with an example embodiment.
Figure 13B:
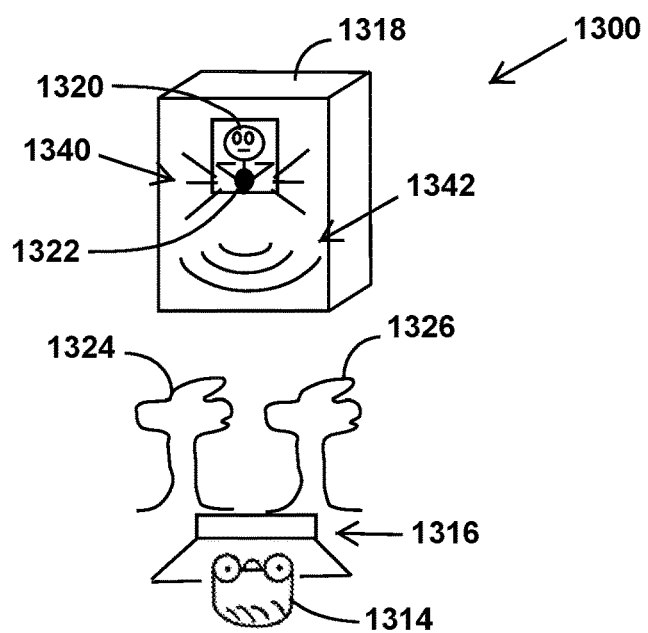
FIG. 13B shows another electronic device determining target information on the target in accordance with an example embodiment.

FIGS. 13A and 13B show electronic devices that determine target information and determine an aim of a weapon, a direction of fire of the weapon, and a location where the weapon fired. The figures show a geographical location 1300 that includes a first user 1310 with one or more electronic devices 1312 and a second user 1314 with one or more electronic devices 1316 that are viewing or monitoring a building 1318. The building 1318 includes a person 1320 in a window of the building while the person 1320 fires a weapon 1322 at the second user 1314 who is located between two trees 1324 and 1326.

FIG. 13A shows a point of view or a field of view of user 1310 when this user and/or one or more electronic devices 1312 look at, monitor, or sense the geographical location 1300. The field of view of the user and/or electronic device of the user shows the person 1320 aiming and firing the weapon 1322 toward the second user 1314.

FIG. 13B shows a point of view or a field of view of user 1314 when this user and/or one or more electronic devices 1316 look at, monitor, or sense the geographical location 1300. The field of view of the user and/or electronic device of the user shows the person 1320 aiming and firing the weapon 1322 toward the user 1314.

One or more of the electronic devices 1312 and 1316 determine target information that includes a direction of aim of the weapon 1322, a direction of fire of the weapon 1322, a person and/or object at whom the weapon 1322 is aiming and/or firing, and other information discussed herein (such as target information, user information, and/or object information). By way of example, FIG. 13A shows one or more electronic devices 1312 determining a distance (D1) from the electronic device and/or user 1310 to the person 1320 and/or weapon 1322, a distance (D2) parallel to ground from the electronic device and/or user 1310 to a base location of the person 1320 and/or weapon 1322, a distance (D3) from the electronic device and/or user 1310 to the person 1314 and/or electronic device 1316 (shown in FIG. 13B), a height (H) of the person 1320 and/or weapon 1322 in the building 1318, an angle (θ) of aim or fire of the weapon 1322 between a vertical line from the person 1320 and/or weapon 1322 to ground and a line of sight 1330 of the weapon 1322 and/or a line of fire of a projectile from the weapon 1322. As another example, FIG. 13B shows one or more electronic devices 1316 determining a flash of light 1340 and a sound wave 1342 emanating from the weapon 1322.

Consider an example in which one or more of the electronic devices 1312 and 1316 include a rangefinder that determines a distance from the electronic device to a location, a compass or directional finder that determines a direction of the electronic device and/or the rangefinder (such as compass direction of a point of aim of the electronic device and/or an object connected to or engaged with the electronic device), an electronic leveler that determines an angle or point of aim with respect to ground of the electronic device, a Global Positioning System (GPS) that determines a location of the electronic device and/or a GPS location of a location to where the rangefinder is aimed, a microphone that captures sound, a camera that captures photographs and/or video, an infrared sensor that determines heat signatures or elevated temperatures of objects and/or people, a clock or timer that tracks or times events of the electronic devices, a memory that stores a location recommender, and a processor that communicates with the memory and other electronic devices.

Consider further the example above in which the one or more electronic devices 1312 and 1316 include electronic devices such as the rangefinder. Electronic device 1312 determines and/or measures heights (such as a height of the building 1318, a height (H) of the person 1320 and/or weapon 1322, various distances to objects and/or the people (such as distances (D1, D2, D3)), various angles between objects and/or people (such as angle (θ)), a flash of the weapon 1322 and a time of the flash, a sound of the weapon 1322 and a time of the sound, a photograph and/or video of the person 1320 firing the weapon 1322, analysis of the photograph and/or video with photogrammetry, and an angle of aim or fire of the weapon 1322. Electronic device 1314 determines and/or measures various distances (such as a distance to the person 1320 and/or weapon 1322 and a distance along the ground to the building 1318), heights (such as a height of the person 1320 and/or weapon 1322), various angles (such as an angle to the person 1320 and/or weapon 1322), a flash of the weapon 1322 and a time of the flash, a sound of the weapon 1322 and a time of the sound, a photograph and/or video of the person 1320 firing the weapon 1322, and analysis of the photograph and/or video with photogrammetry. The electronic device 1314 also determines an angle with respect to ground with an electronic leveler (such as a level sensor, digital level, a magnetic level and angle locator, a magnetic laser level, a tilt sensor or tilt meter, inclinometer, or an accelerometer). For example, an electronic leveler Based on this determined information, one or more of the electronic devices 1312 and 1316 and/or a target recommender, determines a location of fire of the weapon 1322 as being at or near the user 1314 and provides this determination to the electronic devices, users, other electronic devices, and/or other users.

Figure 14A:
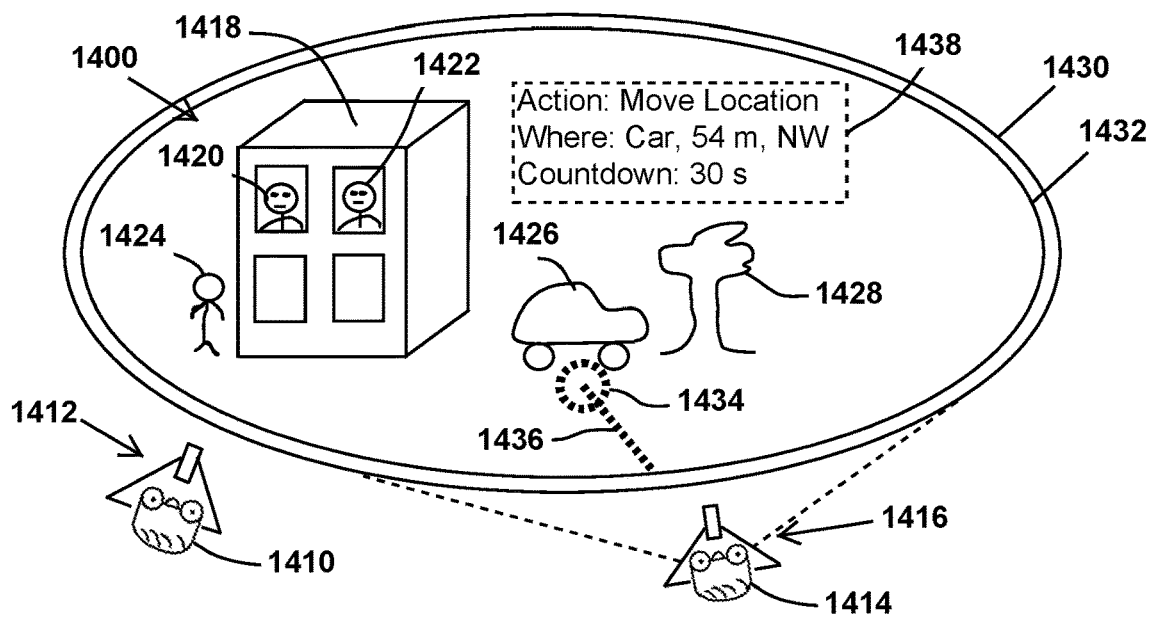
FIG. 14A shows a first electronic device determining and/or providing target information in accordance with an example embodiment.
Figure 14B:
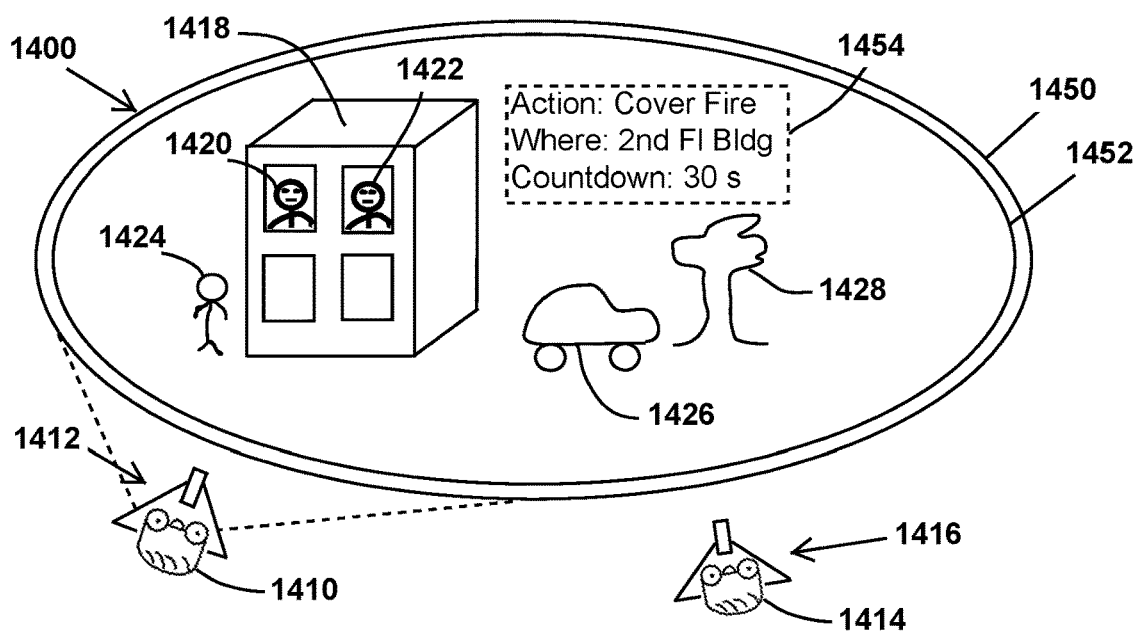
FIG. 14B shows a second electronic device determining and/or providing target information in accordance with an example embodiment.
Figure 14C:
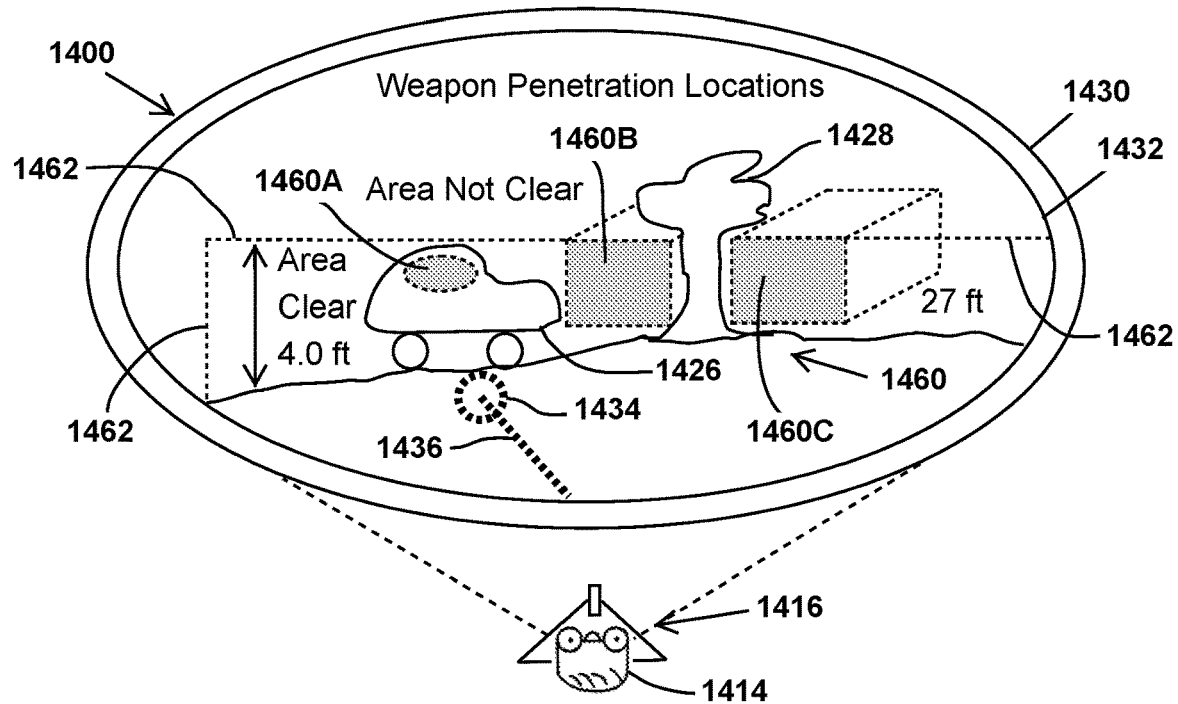
FIG. 14C shows the first electronic device determining and/or providing weapon penetration locations in accordance with an example embodiment.

FIGS. 14A-14C show electronic devices that determine target information and a move location for a user and weapon penetration locations and/or weapon vulnerability locations of an object or area for a user. The figures show a geographical location 1400 that includes a first user 1410 with one or more electronic devices 1412 and a second user 1414 with one or more electronic devices 1416 that are viewing or monitoring a building 1418. The building 1418 includes two people 1420 and 1422 in windows of the building while another person 1424 walks near the building. The geographical location 1400 also includes an automobile 1426 next to a tree 1428.

FIG. 14A shows an electronic device 1430 of user 1414. A display 1432 of the electronic device 1430 displays a recommendation for the user 1414 to move from a current location to a different location 1434 (shown by way of example as being next to the automobile 1426). The recommendation to move includes a path or route 1436 that shows where the user to move to get to the different location 1434. The recommendation also includes instructions 1438 that include instructions or an action notifying the user to move (shown as "Action: Move Location"), a description of and directions to the location to where the user will move (shown as "Where: Car, 54 m, NW"), and a time when the user should move (shown as "Countdown: 30 s").

The instructions 1438 inform the user where to move and how to get to the suggested or recommended location. As shown in the example instructions 1438, the recommended location is at a car that is located fifty-four meters (54 m) away from the user in a compass direction that is Northwest (NW) from the user. The route 1436 shows the path that the user should take to move to the location, and the location 1434 includes an area or location (shown as a dashed circle) for where the user should stand, sit, crouch, or otherwise locate himself or herself at the recommended location. For example, the path 1436 and location 1434 represent safe areas (e.g., areas not within a weapon penetration location and/or weapon vulnerability location).

FIG. 14B shows an electronic device 1450 of user 1410. A display 1452 of the electronic device 1450 displays instructions 1454 to the user 1410. The instructions 1454 include instructions or actions for the user 1410 to take (shown as "Action: Cover Fire"), a location where to perform the instructions or the action (shown as "Where: 2nd Fl Bldg"), and a time when to perform the instructions or the action (shown as "Countdown: 30 s").

The instructions 1454 instruct the user 1410 to fire his weapon in order to provide covering fire for another user so the other user can move to a different location. The instructions also inform the user where to fire his weapon (i.e., at the second floor of the building 1418). Two individuals 1420 and 1422 are visually highlighted on the display 1452 to show the user 1410 where to fire his weapon (i.e., fire the weapon at the two individuals located at the second floor of the building). The instructions 1454 further inform the user

1410 when in time to fire his weapon in the future to provide the covering fire (i.e., fire your weapon in thirty seconds, 30 s).

The countdown displayed to the user 1410 is synchronized with the countdown displayed to the user 1414 so both countdowns count down at the same time. In this manner, both users are instructed to perform an action at the same time. In thirty seconds, user 1410 will fire his weapon at the second floor of the building and concurrently user 1414 will move to a cover location next to the automobile 1426 while user 1410 fires his weapon.

The displays of the electronic devices show a countdown but example embodiments can utilize other methods and apparatus to instruct the users to perform actions. For example, the displays include clocks, counters, or watches that provide a time when both users are instructed to perform the requested action. For instance, display 1432 displays a green indication to show the user 1414 that it is safe to move to the different location. As another example, one or more electronic devices can automatically perform the action at the desired time. For instance, a weapon of the user 1410 automatically fires at a certain time or when the user 1414 desires to move or begins to move to the different location.

The displays can use one or more of sound, color, highlights, light, indicia, text, arrows, images, visual indications, etc. to show the users where or when in time to provide or perform the instructions or actions.

FIG. 14C shows the display 1432 of the electronic device 1430 that displays weapon penetration locations 1460 at the location 1434. These weapon penetration locations show the user different locations or areas where the user could be vulnerable to or struck with incoming fire from a weapon (e.g., from a weapon of the two individuals 1420 and 1422 shown in FIGS. 14A and 14B). For illustration, the weapon penetration locations 1460 include various types of visual indications to instruct the user. By way of example, these locations include colored or highlighted areas 1460A, 1460B, and 1460C (shown as grey areas in FIG. 14C) and dashed lines 1462 that instruct a height of the safe area and non-safe area. For instance, the display 1432 displays that a safe or clear area is from the ground to four feet above the ground (shown with an arrow and "Area Clear 4.0 ft"). An area above four feet is not safe or not clear (shown above the dashed lines 1462 as "Area Not Clear"). A user can clearly see or distinguish the weapon penetration locations and/or weapon vulnerability locations.

As shown in FIG. 14C, the display 1432 indicates a weapon penetration location 1460A on the automobile 1426 and weapon penetration locations around or proximate to the automobile. When the user 1414 arrives at the recommended location 1434, the user can see where he is vulnerable to be hit with weapons from combatants and/or targets. These locations can also indicate where the user can be seen or monitored by the combatants and/or targets.

The weapon penetration locations and/or weapon vulnerability locations 1460 include two-dimensional (2D) and/or three-dimensional (3D) areas or zones that are displayed and/or provided to the user. For example, weapon penetration locations 1460B and 1460C are 3D colored or highlighted zones that visually show the user boundaries or perimeters of the weapon penetration locations. These zones show a shape and a size of the weapon penetration locations and can further include dimensions for size (such as length, width, and height of an area). For illustration, weapon penetration location 1460C shows a depth or length of twenty-seven feet (27 ft).

Consider an example in which a target recommender displays a visual recommendation on display 1432 for user 1414 to move to location 1434 (shown in FIG. 14A). Just before the user 1414 commences to move to this location, user 1410 fire his weapon at the second floor of the building 1418 and provides covering fire so the user 1414 can safely move to the location 1434. As or when the user 1414 arrives to the location 1434, the display 1432 provides various weapon penetration locations as 3D images (shown in FIG. 14C). The user 1414 can see where to physically position himself next to the automobile 1426 in order to not be hit with incoming fire from weapons of individuals 1420 and 1422 (shown in FIG. 14A). Based on this visual information, the user 1414 positions himself next to the automobile 1426 but is aware that bullets or fire from weapons can penetrate the front and side windows of the automobile (shown as weapon penetration location 1460A in FIG. 14C).

Consider an example in which users 1410 and 1414 wear wearable electronic glasses or wearable electronic devices that include a see-through display that display the instructions, move location, weapon penetration locations, etc. For example, highlights appear on or over the two individuals 1420 and 1422 (shown as darkened outlines of the two individuals in FIG. 14B) so the user 1410 can quickly identify the individuals as targets. As another example, the weapon penetration locations 1460 appear as 3D images or 3D zones at their respective physical or geographical locations so the user 1414 can see a size, shape, and location of the weapon penetration locations (shown in FIG. 14C).

Figure 15:
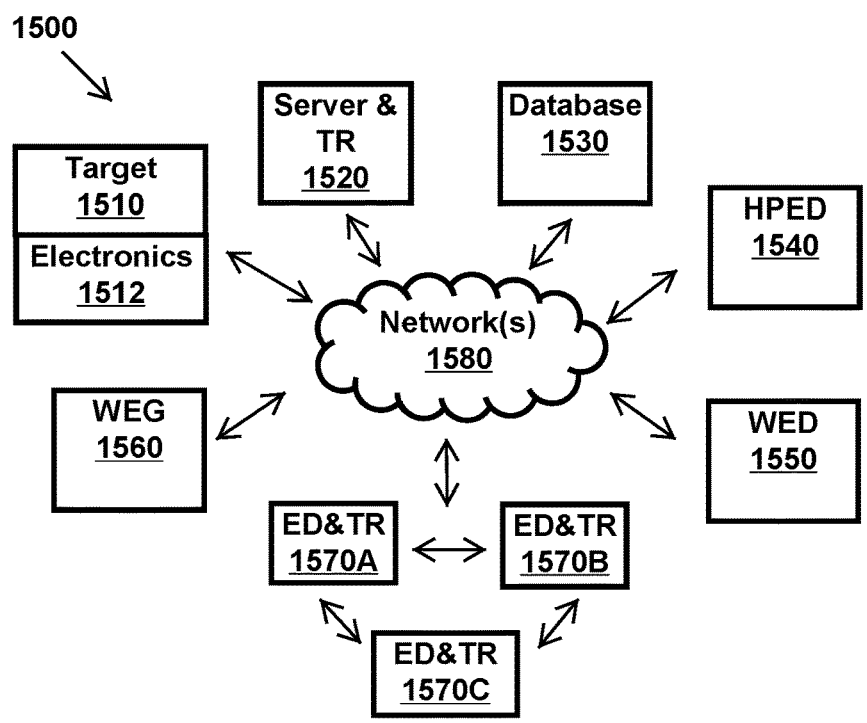
FIG. 15 is an electronic device system or a computer system in accordance with an example embodiment.

FIG. 15 is an electronic device system or a computer system 1500 (such as CTAARS) that includes one or more of the following: a target 1510 including or in communication with electronics or an electronic device 1512, a server and a target recommender (TR) 1520, a database 1530 or other storage or memory, a handheld portable electronic device or HPED 1540, a wearable electronic device or WED 1550, wearable electronic glasses or WEG 1560, a plurality of electronic devices (ED) with target recommenders 1570A, 1570B, and 1570C that can communicate with each other (e.g., over a private or secure network), and one or more networks 1580 through which electronic devices can communicate (such as wirelessly communicate).

Figure 16:
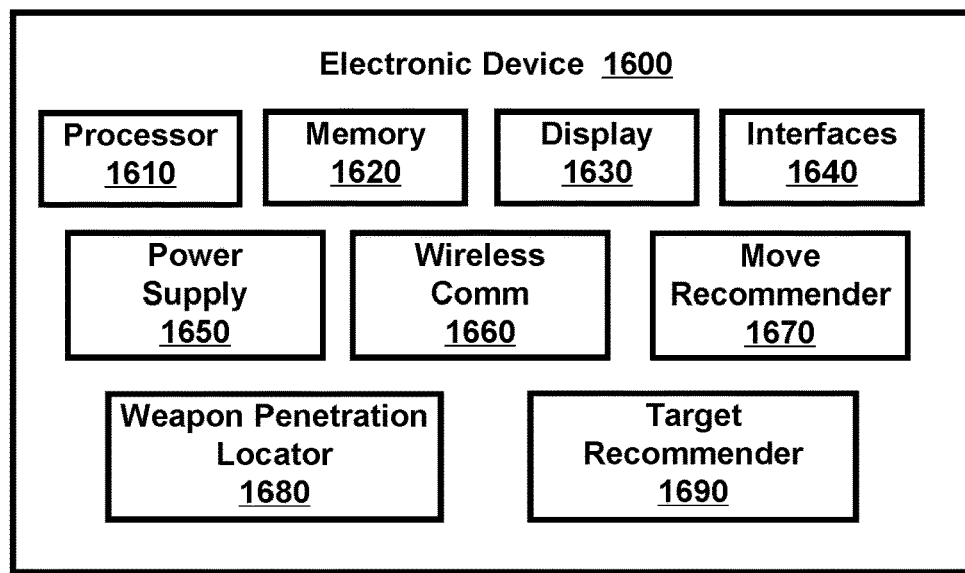
FIG. 16 is an electronic device in accordance with an example embodiment.

FIG. 16 is an electronic device 1600 that includes one or more of the following: a processing unit or processor 1610, a computer readable medium (CRM) or memory 1620, a display 1630, one or more interfaces 1640 (such as a network interface, a graphical user interface, a natural language user interface, and/or an interface that combines reality and virtuality), a battery or a power supply 1650, wireless communication 1660, a move recommender 1670 (such as an electronic system that determines locations for a user to move), a weapon penetration locator 1680 (such as an electronic system that determines weapon penetration locations and/or weapon vulnerability locations on objects or at areas), and a target recommender 1690 (such as an electronic system that executes one or more example embodiments discussed herein to determine an orientation of a target). The move recommender 1670, weapon penetration locator 1680, and target recommender 1690 are shown as separate boxes but can be included together (such as being provided together in the target recommender).

Figure 17:
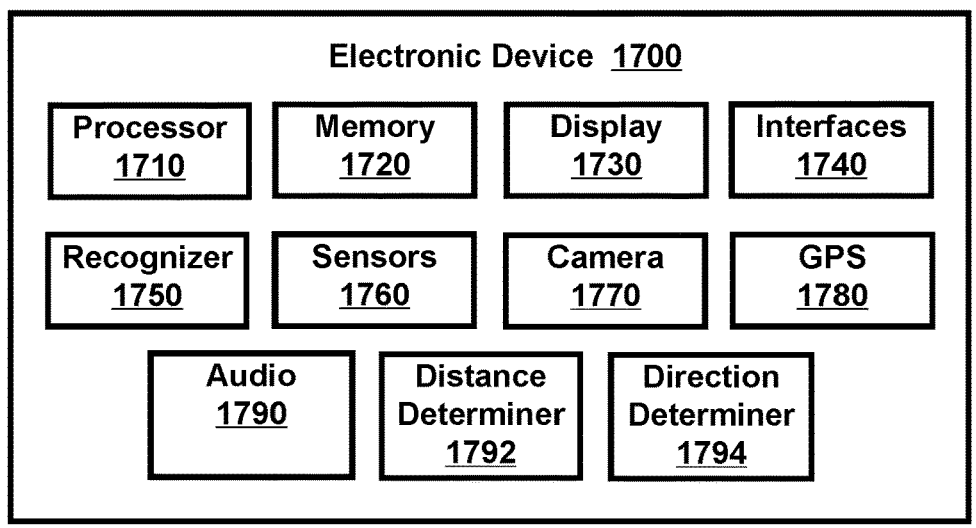
FIG. 17 is an electronic device in accordance with an example embodiment.

FIG. 17 is an electronic device 1700 that includes one or more of the following: a processing unit or processor 1710, a computer readable medium (CRM) or memory 1720, a display 1730, one or more interfaces 1740 (such as a network interface, a graphical user interface, a natural language user interface, and/or an interface that combines reality and virtuality), one or more recognizers 1750 (such as object recognition software, facial recognition software, and/or animal recognition software), one or more sensors 1760 (such as micro-electro-mechanical systems sensor, a motion sensor, an optical sensor, radio-frequency identification sensor, a global positioning satellite or system sensor, a solid state compass, gyroscope, an accelerometer, an electronic leveler, and/or a weather sensor), a camera 1770 (including lenses, such as lenses for an electronic scope that mounts a firearm), a global positioning system or GPS 1780, audio 1790 (such as a microphone or speakers), a distance determiner 1792 (such as a laser, an electromagnetic wave transmitter/receiver, a rangefinder, and/or a camera), and a direction determiner or an orientation determiner 1794 (such as a compass, a magnetometer, a heading indicator, an inclinometer, a gyroscope, an accelerometer, a sensor, or other electrical device to determine direction).

FIGS. 16 and 17 show various components in a single electronic device. One or more of these components can be distributed or included in various electronic devices, such as some components being included in an HPED, some components being included in a server, some components being included in storage accessible over the Internet, some components being in wearable electronic devices or an electronic scope or an electronic sighting device or a weapon or a projectile, and some components being in various different electronic devices that are spread across a network, a cloud, and/or an electronic device system or a computer system.

The processing unit or processor (such as a central processing unit, CPU, microprocessor, application-specific integrated circuit (ASIC), etc.) controls the overall operation of memory (such as random access memory (RAM) for temporary data storage, read only memory (ROM) for permanent data storage, and firmware). The processing unit or processor communicates with memory and performs operations and tasks that implement one or more blocks of the flow diagrams discussed herein. The memory, for example, stores applications, data, programs, algorithms (including software to implement or assist in implementing example embodiments) and other data.

Consider an example in which the electronic device is an electronic scope mounted to a rifle of a user. The electronic scope captures images in a field of view of the scope and displays targets to the user while the user looks through the scope. For instance, a person visible through the scope appears with a red colored outline to visually identify this person as the intended target to the user. The red colored outline follows or remains fixed on the person as the person moves.

Blocks and/or methods discussed herein can be executed and/or made by a user, a user agent of a user, a software application, an electronic device, a computer, and/or a computer system.

Examples of an electronic device include, but are not limited to, a server, a computer, a laptop computer, a tablet computer, a handheld portable electronic device (HPED), a portable electronic device (PED), a wearable electronic device (WED), wearable electronic glasses (WEG), an electronic scope or an electronic sighting device (such as a scope that mounts to or engages with a firearm), electronic binoculars, a smartphone, a camera, a non-portable electronic device, a movable or flyable electronic device, and an electronic device with a processor, a memory, and a display.

As used herein, "determine" includes to ascertain, to analyze, to evaluate, to process, to calculate, to decide, to obtain, to discover, to retrieve, to execute, and/or to receive.

As used herein, "field of view" is the extent of the observable world that is seen or captured at a given moment.

As used herein, "firearm" is a portable gun, such as a rifle or a pistol.

As used herein, "line of sight" is a straight line that extends from the scope, camera, or other sighting apparatus to the target.

As used herein, "point of aim" is a visual indication of an electronic device that shows where the electronic device is aimed.

As used herein, "target" is one or more of a person, an object, a thing, and an area. A target can include a weapon.

As used herein, "virtual image" or "virtual object" is computer or processor generated image or object. This image or object often appears to a user in the real, physical world (such as a virtual 3D dimensional object that the user views in the real world).

As used herein, "weapon" includes firearms (such as portable guns), archery (such as bow and arrows), light weapons, heavy weapons, and other weapons that launch, fire, or release a projectile.

As used herein, "wearable electronic device" is a portable electronic device that is worn on or attached to a person. Examples of such devices include, but are not limited to, electronic watches, electronic necklaces, electronic clothing, head-mounted displays, electronic eyeglasses or eye wear (such as glasses in which an image is projected through, shown on, or reflected off a surface), electronic contact lenses, an eyetap, handheld displays that affix to a hand or wrist or arm, and HPEDs that attach to or affix to a person.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method comprising:
   receiving, at a user interface of a wearable electronic device (WED) worn on a head of a user, selection of a person in a field-of-view of the WED;
   transmitting, over a wireless network, a location of the person to other WEDs worn on heads of other users; and
   displaying, with the other WEDs worn on the heads of the other users, the person as a virtual image on a map that shows the location of the person and identifies the person as a combatant.

2. The method of claim 1 further comprising:
   simultaneously displaying, with the other WEDs and on the map, virtual images that include locations of combatants that are people, a location of the user, and locations of the other users.

3. The method of claim 1 further comprising:
   displaying, with the other WEDs, the virtual image on the map along with a compass direction to the person who is the combatant.

4. The method of claim 1 further comprising:
   displaying, with the other WEDs, the virtual image on the map in a color red to identify the person as the combatant and virtual images of the other users in color green or blue.

5. The method of claim 1 further comprising:
   displaying, with the WED, a virtual image on the person in color red to identify the person as the combatant; and
   moving the virtual image so the virtual image remains on the person as the person moves.

6. The method of claim 1 further comprising:
   displaying, with the other WEDs, the virtual image on the map in color red to instruct the other users to fire upon the person.

7. The method of claim 1 further comprising:
   displaying, with the WED worn on the head of the user, a three-dimensional (3D) map that displays a path for where the user should move.

8. The method of claim 1 further comprising:
   displaying, with a see-thru display of the WED worn on the head of the user, a distance to the person, a compass direction to the person, and a virtual object with a color red identifying the person as the combatant.

9. A wearable electronic device (WED) worn on a head of a user, the WED comprising:
   a user interface that receives, from the user wearing the WED on the head, selection of a target in a field-of-view of the WED; and
   a display that displays, over the target and in response to receiving the selection, a virtual image that identifies the target as a combatant who is a person and displays a map that shows virtual images of other users, wherein the WED includes or is in communication with a transmitter that transmits a location of the target to WEDs of the other users.

10. The WED of claim 9, wherein the display displays a compass direction to the combatant and a distance to the combatant.

11. The WED of claim 9, wherein the display displays a map that simultaneously shows the other users with color blue or green and the combatant with color red.

12. The WED of claim 9, wherein the virtual image being displayed on the person moves and remains on the person as the person moves in the field-of-view of the WED.

13. The WED of claim 9, wherein the display is a see thru display that displays the virtual image on the person with a color red to identify the person as the combatant.

14. The WED of claim 9 further comprising:
    a receiver that receives, from a flying drone, images of targets at a geographical location of the user, wherein the display displays virtual images on the targets to assist the user in distinguishing the targets from non-targets.

15. The WED of claim 9, wherein the display assists the user in moving to a safe area by displaying a virtual path that shows a path to the safe area.

16. A wearable electronic device (WED) worn on a head of a user, the WED comprising:
    a user interface that receives, from the user wearing the WED on the head, selection of a person in a field-of-view of the WED; and
    a display that displays, on the person, a virtual image that visually identifies the person as a combatant, wherein the display moves the virtual image so that the virtual image remains on the person as the person moves in the field-of-view of the WED.

17. The WED of claim 16 further comprising:
    a transmitter that transmits, over a wireless peer-to-peer (P2P) network, a location of the person to other WEDs worn on heads of other users.

18. The WED of claim 16, wherein the virtual image has a color red to identify the person as the combatant and to instruct the user to fire a firearm at the combatant.

19. The WED of claim 16, wherein the display displays a map that shows a compass direction to the combatant, virtual objects of other users wearing WEDs, and virtual objects of other combatants.

20. The WED of claim 16, wherein the display displays the virtual image in color red to identify the person as the combatant and other virtual images in colors blue or green to identify other people as not being combatants.

* * * * *